United States Patent [19]
Hammer et al.

[11] Patent Number: 5,204,954
[45] Date of Patent: Apr. 20, 1993

[54] REMOTE STORAGE MANAGEMENT MECHANISM AND METHOD

[75] Inventors: William E. Hammer, Rochester; Walter H. Schwane, Kasson; Frederick J. Ziecina, Rochester, all of Minn.

[73] Assignee: International Business Machines Corporation, Armonk, N.Y.

[21] Appl. No.: 922,283

[22] Filed: Jul. 29, 1992

Related U.S. Application Data

[63] Continuation of Ser. No. 524,121, Apr. 20, 1990, abandoned, which is a continuation of Ser. No. 122,296, Nov. 18, 1987, abandoned.

[51] Int. Cl.$^5$ .............................................. G06F 9/46
[52] U.S. Cl. ................................................. 395/425
[58] Field of Search ................ 395/400, 425, 164–166

[56] References Cited

U.S. PATENT DOCUMENTS

| | | | |
|---|---|---|---|
| 4,145,739 | 3/1979 | Dunning et al. | 364/200 |
| 4,325,120 | 4/1982 | Colley et al. | 364/200 |
| 4,449,182 | 5/1984 | Rubinson et al. | 364/200 |
| 4,545,014 | 10/1985 | Oguchi | 364/200 |
| 4,601,586 | 7/1986 | Bahr et al. | 370/94 |
| 4,649,473 | 3/1987 | Hammer et al. | 364/200 |
| 4,685,057 | 8/1987 | Lemone et al. | 364/200 |

OTHER PUBLICATIONS

"REX:a remote execution protocol for object-oriented distributed applications" Dave Otway, Ed Oskiewicz, The Advanced Networked Systems Architecture Project.

Primary Examiner—Heather R. Herndon
Attorney, Agent, or Firm—Richard E. Billion; Bradley A. Forrest

[57] ABSTRACT

The flow of work requests in a server driven process to process communication environment is described. Logical connections between processes and bus managers interfacing bus units to an I/O bus are assigned to connection groups for management by the bus managers. Each bus unit has its own connection groups for the logical connections. Bus unit resources are assigned to each connection group based on performance factors, and a series of bus unit messages are used to control the flow of work so that a group which has no more resources will not accept further work requests. The originator of the work requests will resequence rejected work requests and resend them when the connection group has freed up resources. A further mechanism is provided to facilitate work consistent with the server driven architecture when bus units do not have adequate DMA capabilities. Two ways of reversing control of transfer of work requests and data so that the server need not have master DMA capability are presented. Management of storage in a remote processor is used to transfer work and its associated data into storage accessible by a bus unit with slave DMA capability. The slave DMA bus unit then transfers the information into storage is manages. In another way of reversing the flow, a bus unit message is used to make the original server a requestor. The bus unit message contains information which varies the request sent by the requestor. In this manner, the server, which was the original requestor transfers information using its master DMA capability flow.

42 Claims, 29 Drawing Sheets

BUS ERROR CONDITION

| RESERVED | BUS UNIT | 82 | WORD 1 |
|---|---|---|---|
| CONTROL FIELD ||| WORD 2 |
| CFID | ACTN | ERROR STATUS | CONN GROUP ID | WORD 3 |

FIG. 9

QUEUE SPACE AVAILABLE

| RESERVED | RESERVED | OF | WORD 1 |
|---|---|---|---|
| RESERVED | | GROUP | WORD 2 |
| RESERVED | | | WORD 3 |

FIG. 10

RESTART QUEUE

| RESERVED | RESERVED | OD | WORD 1 |
|---|---|---|---|
| RESERVED | | GROUP | WORD 2 |
| RESERVED | | | WORD 3 |

FIG. 11

OPSTART

| RESERVED | LENGTH | TYPE | WORD 1 |
| --- | --- | --- | --- |
| ADDRESS OF THE RRCB ||| WORD 2 |
| SERVER CID ||| WORD 3 |

FIG. 13

REQUEST/RESPONSE CONTROL BLOCK

| LENGTH OF RRCB | RESERVED | TYPE | WORD 1 |
|---|---|---|---|
| SERVER CONNECTION ID | | | WORD 2 |
| REQUEST PRIORITY | RESERVED | FLAGS | WORD 3 |
| REQUESTOR RID | | | WORD 4 |
| RESERVED | | | WORD 5 |
| EXTENDED STATUS POINTER | | | WORD 6 |
| DATA FLAGS | DATA LENGTH | | WORD 7 |
| DATA ADDRESS/ DATA | | | WORD 8 |
| DATA FLAGS | DATA LENGTH | | |
| DATA ADDRESS/ DATA | | | |
| DATA FLAGS | DATA LENGTH | | |
| DATA ADDRESS/ DATA | | | |
| DATA FLAGS | DATA LENGTH | | |
| DATA ADDRESS/ DATA | | | |

FIG. 14

REQUEST RESPONSE CONTROL BLOCK ADDITION

| DATA FLAGS | DATA LENGTH | WORD 1 |
|---|---|---|
| DATA ADDRESS/ DATA || WORD 2 |
| DATA FLAGS | DATA LENGTH | |
| DATA ADDRESS/ DATA || |
| DATA FLAGS | DATA LENGTH | |
| DATA ADDRESS/ DATA || |
| DATA FLAGS | DATA LENGTH | |
| DATA ADDRESS/ DATA || |

FIG. 15

OPEND

| RESERVED | FLAG | 02 | WORD 1 |
| --- | --- | --- | --- |
| RID ||| WORD 2 |
| COMPLETION STATUS - USER ||| WORD 3 |

FIG. 16

STORAGE REQUEST

| RESERVED | RESERVED | 06 | WORD 1 |
|----------|----------|----|--------|
| RESERVED | STORAGE SIZE || WORD 2 |
| RESERVED | LENGTH OF BUFFERS || WORD 3 |

FIG. 17

STORAGE LIST AVAILABLE

| RESERVED | FLAG | 07 | WORD 1 |
|---|---|---|---|
| ADDRESS OF STORAGE LIST CONTROL BLOCK | | | WORD 2 |
| RESERVED | | LENGTH | WORD 3 |

FIG. 18

STORAGE LIST CONTROL BLOCK

| RESERVED | BUS NUMBER | BUS UNIT | WORD 1 |
|---|---|---|---|
| NUMBER OF BUFFERS | LENGTH OF BUFFERS | | WORD 2 |
| BUFFER ADDRESS | | | WORD 3 |
| ⋮ | | | |

FIG. 19

STORAGE LIST COMPLETE

| RESERVED | FLAG | 08 | WORD 1 |
|---|---|---|---|
| ADDRESS OF STORAGE LIST CONTROL BLOCK ||| WORD 2 |
| RESERVED | (LENGTH OF BUFFERS) || WORD 3 |

FIG. 20

RETURN STORAGE LIST

| RESERVED | FLAG | 09 | WORD 1 |
|---|---|---|---|
| ADDRESS OF REQUESTED STORAGE LIST ||| WORD 2 |
| RESERVED | LENGTH OF BUFFERS || WORD 3 |

FIG. 21

ALTERNATE VERSION SIGNAL

| | | | |
|---|---|---|---|
| WORD 1 | RESERVED | 00 | TYPE |
| WORD 2 | LENGTH | | OFFSET |
| WORD 3 | RAS CONNECTION ID | | |

FIG. 27

DMA REQ

| RSVD | LENGTH | DMA ID | OX | WORD 1 |
|------|--------|--------|----|----|
| DATA ADDRESS IN REQUESTOR PROCESSOR ||| | WORD 2 |
| DATA ADDRESS IN SERVER PROCESSOR ||| | WORD 3 |

FIG. 28

DMA COMP

| RESERVED | DMA ID | 05 | WORD 1 |
|----------|--------|----|----|
| RESERVED ||| WORD 2 |
| RESERVED ||| WORD 3 |

FIG. 29

REMOTE STORAGE MANAGEMENT MECHANISM AND METHOD

CROSS REFERENCE TO RELATED APPLICATIONS

This is a continuation of co-pending application Ser. No. 07/524,121 filed on Apr. 20, 1990, abandoned, which is a continuation of the Applicant's prior copending application Ser. No. 122,296, filed Nov. 18, 1987, now abandoned.

INCORPORATION BY REFERENCE AND CROSS REFERENCE

U.S. Pat. No. 4,649,473, assigned to the same assignee as the present invention, is hereby incorporated by reference.

Cross reference is made to co-pending U.S. patent application Ser. No. 122,292 for BUS FLOW CONTROL MECHANISM filed on the same date herewith.

Cross reference is made to co-pending U.S. patent application Ser. No. 122,294 for REVERSE FLOW CONTROL MECHANISM AND METHOD filed on the same date herewith.

BACKGROUND OF THE INVENTION

The invention relates to control of work flow between processes on a bus, and in particular to the reversal of the normal flow of communications between processes on bus units not having symmetrical DMA capabilities.

In prior process to process communications, where the methods of communication are transparent to the communicating processes, one unit containing processes requests work to be performed by another unit on the bus. The data to be operated on is in the requestor's storage, and the server unit, that is, the unit that is executing the request, has access to the data.

The normal flow of data involves the bus unit which contains the process serving the work request to DMA the work request and the data associated with it from the requesting bus unit's storage into the server bus unit's storage. In the case of the server bus unit being a direct access storage controller attached to an I/O bus, this is easy to do, as the I/O controller has master DMA capability, and the host bus unit which originated the work request has slave DMA capability. This means that the I/O controller with master DMA capability can access the host main storage directly through the I/O bus, without interrupting the processor in the host bus unit.

A problem arises when the I/O unit is the originator of the work request. In a server driven work processing architecture such as described in U.S. Pat, No. 4,649,473 which is incorporated herein by reference, the architecture requires that the process which is serving the work access the data when it desires, and need not receive the data with the indication of the work request, as was done in prior systems. Since the host does not have master DMA capability, nor does the I/O controller have slave DMA capability, a host server cannot access data in the I/O controller work requester. There must be some means of controlling the flow of data consistent with the architecture. Some systems have transferred all data associated with a request to the server via normal bus communications.

A bus transport mechanism has been used in prior systems to provide for data flow transparent to the communicating processes. The bus transport mechanisms have usually assumed that one of the bus units will always initiate work requests, and the other of the bus units will always be a work server. Each bus unit is then given the appropriate hardware DMA capability. As bus units become more and more sophisticated, this is no longer the case. Many newer bus units are becoming available with more and more intelligence, and hence the need to initiate work requests. In fact, if bus units are peer processors, the chances are that each processor will serve as many work requests as it generates work requests. There are many cases where a processor may not want to have slave DMA capability because of the expense of extra hardware involved, or because it wants total control of its main storage. Where there is an imbalance in the DMA capabilities of the bus units, the ability to control the flow of data becomes even more important.

SUMMARY OF THE INVENTION

A requester bus unit uses a Storage List Request bus message to request management of remote storage in a server bus unit main storage. The Storage List Request contains fields which indicate the total amount of remote storage requested, and the length of buffers it desires. The server bus unit receives the message, and checks for buffers of at least the length indicated. It creates a Storage List Control Block which identifies the starting address and length of each buffer found and for which management responsibility is to be transferred. The server bus unit then sends a Storage List Available message to the requester bus unit which indicates if long enough buffers were found, and where to find the Storage List Control Block.

In one preferred embodiment, the requester bus unit is a storage controller having master DMA capability, and the server bus unit is a host having slave DMA capability. A bus unit is a processing unit attached to the bus in a distributed processor network. It may include one or more host processors for example. Master DMA capability is simply the ability of a bus unit to access the main storage of a bus unit with slave DMA without interrupting the processor in the bus unit. The host is not able to access the controller main storage to obtain the work request nor the associated data. The controller, when a process within it generates a work request, will then place the work request and the associated data into storage in the host which is managed by the controller. Management responsibility includes the right to read and write the remote storage as desired. The host may also read the remote storage and write responses in controller specified locations. The controller then sends an Opstart message to the host. The Opstart message is a bus message which indicates that there is a work request to be acted on by a server process and identifies the location in remote storage (actually local storage to the server) where a control block is. The control block identifies the remote storage location of the work request and associated data. The host then transfers the information into storage it manages for a server process to access. The host writes the response into the storage indicated in the control block.

One benefit of the present invention is that management responsibility for portions of storage may be transferred between different bus units in a dynamic manner using predefined bus messages. The remote storage so managed has use in masking non-symmetrical hardware without the expense of added hardware. It provides symmetry at the process to process interface, even when the underlying hardware is not symmetric. A further benefit of the present invention is that remote storage can be used to balance performance of bus units in a system. If one bus unit is performance bound due to lack of main storage, remote buffers can be used to increase its performance. Thus, resources can be shifted from a bus unit with extra resources to a bus unit with too few resources to increase overall system performance.

BRIEF DESCRIPTION OF THE DRAWINGS

FIG. 9 is a block diagram showing the fields of a Bus Error Condition message for reporting errors, and indicating a Queue Full status.

FIG. 10 is a block diagram showing the fields of a Queue Space Available message for indicating that resources are free for a connection group.

FIG. 11 is a block diagram showing the fields of a Restart Queue message for informing a connection group to start accepting work requests.

FIG. 13 is a block diagram showing the fields of an Opstart message for indicating that there is a work request for an identified process.

FIG. 14 is a block diagram showing the fields of a Request/Response Control Block used to identify the location of requests and data.

FIG. 15 is a block diagram showing the fields of an addition to the Request/Response Control Block.

FIG. 16 is a block diagram showing the fields of an Opend message for indicating that there is a response to a work request.

FIG. 17 is a block diagram showing the fields of a Storage Request message for requesting remote storage to manage.

FIG. 18 is a block diagram showing the fields of a Storage List Available message for indicating the location of a list of storage to be remotely managed.

FIG. 19 is a block diagram showing the fields of a Storage List Control Block used to identify remote storage to be managed.

FIG. 20 is a block diagram showing the fields of a Storage List Complete message used to return management of remote storage.

FIG. 21 is a block diagram showing the fields of a Return Storage List message used to request return of management of remote storage.

FIG. 27 is a block diagram showing a different version of the Signal message of FIG. 26 for reversing the flow of data associated with a work request.

FIG. 28 is a block diagram showing the fields of a DMA Reg bus message used to request a DMA transfer.

FIG. 29 is a block diagram showing the fields of a DMA Comp bus message used to indicate a DMA transfer is complete.

DETAILED DESCRIPTION

Figure 1:
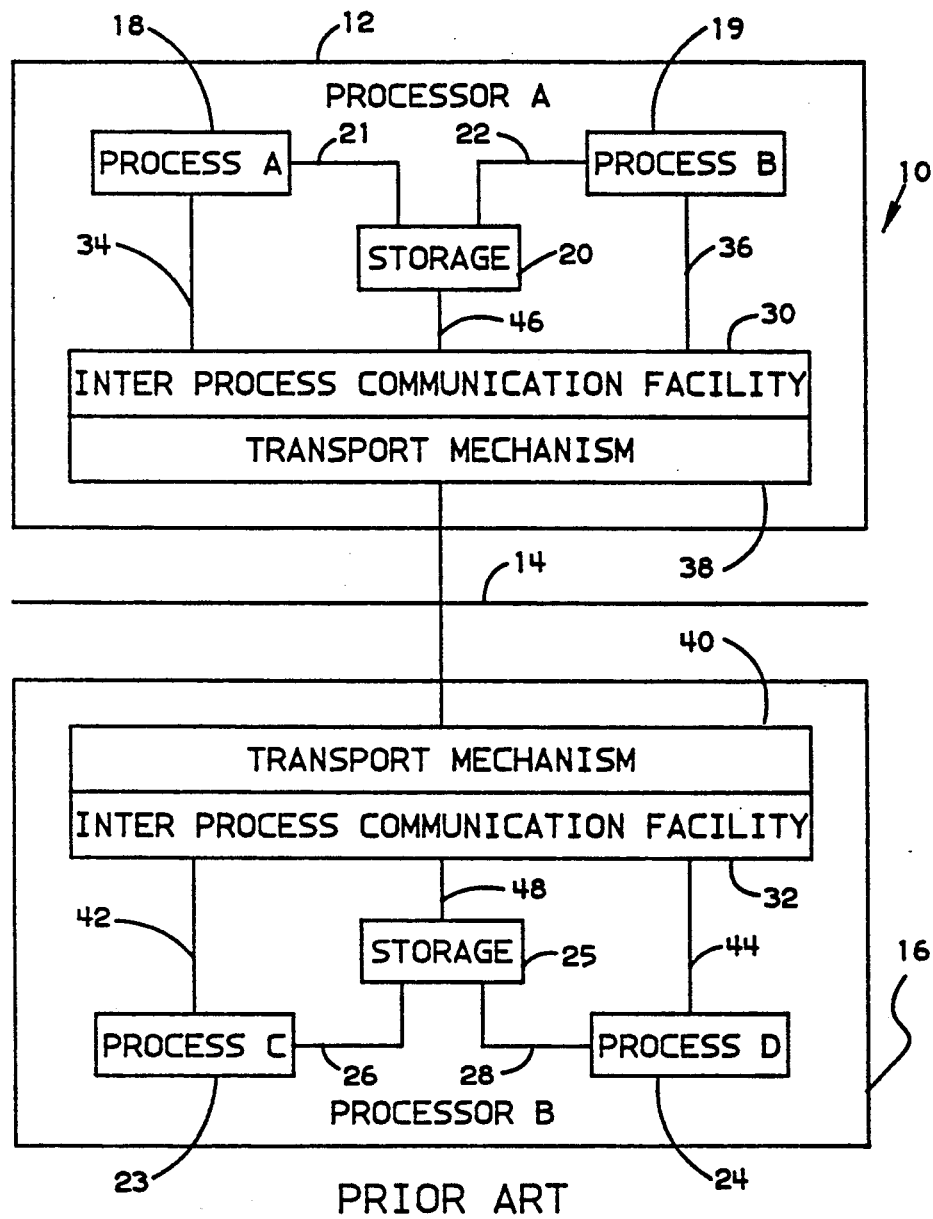
FIG. 1 is a block diagram overview of a multiprocess system having an interprocess communication facility for communication between processes taken from U.S. Pat. No. 4,649,473.

FIG. 1 is taken from U.S. Pat. No. 4,649,473, which is assigned to the same assignee as the present invention. It is used to provide the reader with a foundation for more clearly understanding the invention herein. The immediately following text describes FIG. 1, and concentrates on process to process communication wherein the processes are unaware of the underlying communication management. The underlying bus transport mechanism, and a bus manager which is the subject of this invention will be described in a later section.

In FIG. 1 a high level view of a distributed process environment is indicated generally at 10. A processor A indicated at 12 is coupled by a physical path indicated by a line 14 to a processor B indicated at 16. Processor A is indicated as having a process A indicated at 18 and a Process B indicated at 19 residing therein. A storage area 20 is associated with process A and process B as represented by lines 21 and 22 respectively to provide the process control of and access to data storage.

Processor B is indicated as having a process C indicated at 23 and a process D indicated at 24 residing therein. A storage area 25 is associated with process C and process D as represented by lines 26 and 28 respectively to provide the process control of and access to data storage.

Processes, or executing programs within the processors need to communicate with each other. In processors of differing configurations, or in the same processor as it changes over time, two processes that communicate may be in different relative locations and may have different physical paths between them.

An inter process communication facility (IPCF) is provided within processor A and processor B at 30 and 32 respectively to accommodate inter process communication which is location transparent to the communicating processes. IPCF 30 is coupled to process A in processor A as represented by a line 34 and to process B as represented by a line 36. Lines 34 and 36 represent interfaces between process A and process B to the IPCF 30. These interfaces permit communication between process A and process B provided appropriate data paths are established. IPCF 30 is also coupled through a transport mechanism 40 in processor B to IPCF 32. IPCF 32 is in turn coupled as represented by interface lines 42 and 44 to process C and process D. These interfaces with the IPCFs and the transport mechanisms permit establishment of communication between all the processes indicated, without process knowledge of the location of the process it is communicating with. The transport mechanisms 38 and 40 preferably comprise a plurality of transport mechanisms such as local transport mechanisms for use when process A and process B or process C and process D communicate within a single processor. If processor A and processor B reside in the same machine, a bus transport mechanism is used to facilitate communication between processes on processor A and processor B. For intermachine communication, a communication protocol such as SNA is suitable for use.

The transport mechanisms 38,40 are data movers. They are responsible for transferring bytes of data from one place to another and do not understand the meaning of the information being moved. Thus, storage 20 in processor A is coupled to the transport mechanism 38 as represented by a line 46 and storage 25 in processor B is coupled to transport mechanism 40 as represented by a line 48 to permit information transfers directly by the transport mechanisms 38,40.

The IPCF to the process attempting to communicate chooses the transport mechanism for the communication. The communicating processes need not be aware of the mechanism used. The process attempting to communicate supplies the name of the target process, as it is known to the process attempting to communicate, to the IPCF which uses an appropriate directory service to locate it. The IPCF then selects the appropriate transport mechanism and uses system-supplied services to set up the connection between the processes in a standard manner. IPCF can be used by all levels of processes, from applications to basic system services such as a paging manager.

To permit the use of many different transport mechanisms, each with different capabilities and characteristics, the IPCF includes a generic transport mechanism interface to each process. The interface defines a set of functions for the establishment of connections and for the passing of information between processes. The functions defined are mapped onto the transport mechanisms used by IPCF. Programs written to the interface are independent of the transport mechanism and therefore are independent of their relative locations when communicating.

Communication between processes is in terms of sending and receiving messages over a connection between them as established by IPCF. The messages contain work requests and/or data. Relative to a particular work request, a process assumes the role of a requestor or a server. The requestor initiates a work request by sending a request to a server that carries it out. Requests contain a work request (a command and its parameters) and optionally some data. Both the request and the data are of variable length.

If the reader desires further information on IPCF, and the manner in which connections are established, the above mentioned patent, which is incorporated herein by reference provides further detail. A bus manager, which is part of transport mechanism 38 and 40 is now described.

BUS MANAGER

Figure 2:
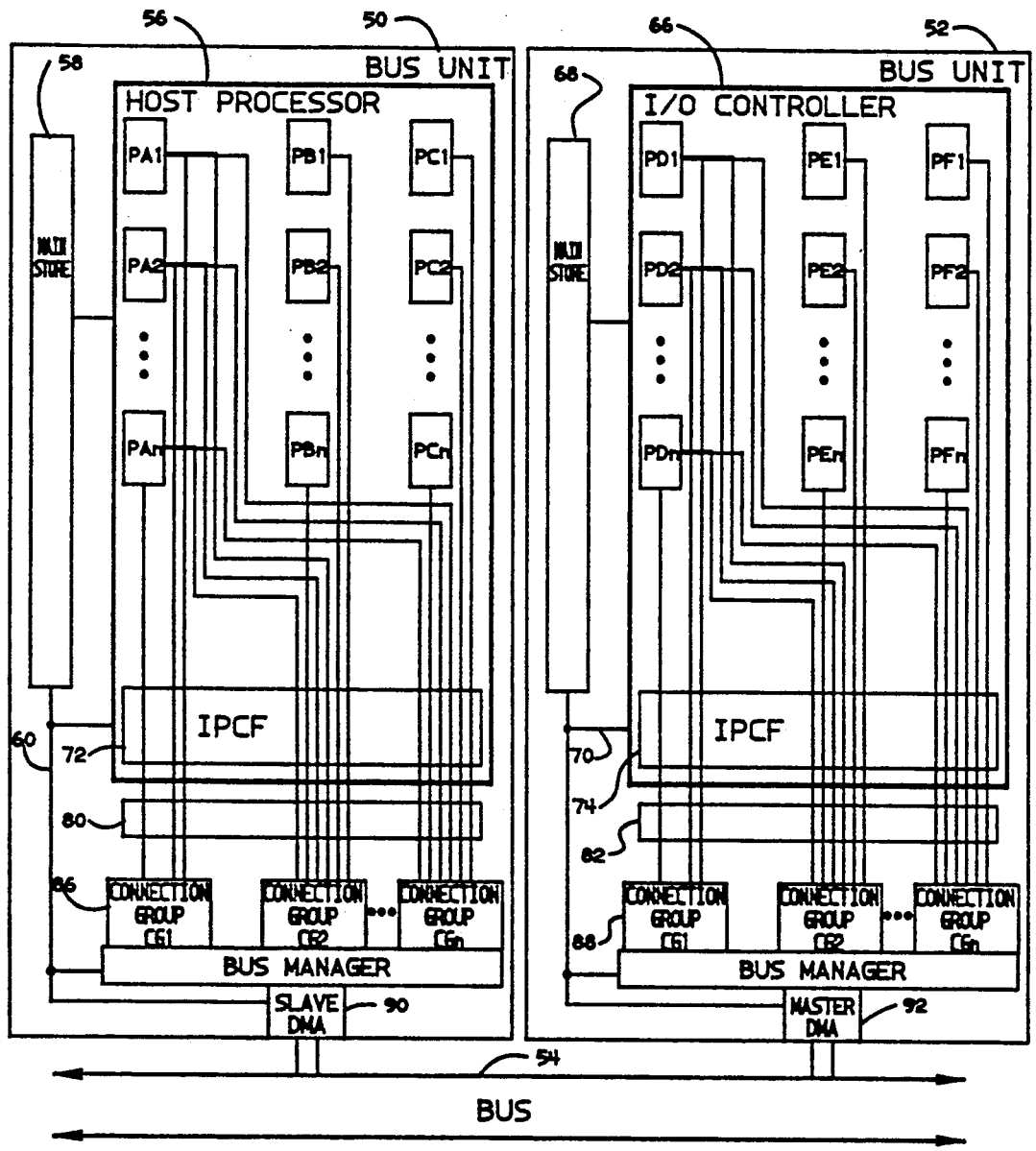
FIG. 2 is a block diagram overview of the multiprocess system of FIG. 1 showing logical connection groups having logical connections between processes.

In FIG. 2, two bus units, 50 and 52 are coupled by a physical path such as an I/O (input and output) bus 54. In one preferred embodiment, bus unit 50 comprises a host processing system with a processor 56 having a main storage 58 coupled thereto by a line 60. Host processor 56 executes a plurality of programs, from accounting programs to operating system programs. An executing instance of a program is referred to as a process. Several processes PA1-PAn, PB1-PBn and PC1-PCn are shown in host processor 56.

Bus unit 52, in one preferred embodiment comprises an I/O processor 66 having a main storage 68 coupled by a line 70. I/O processor 66 also has a number of processes PD1-PDn, PE1-PEn and PF1-PFn which may be executing. While a large number of processes are shown in each of the processors 56 and 66, there may be situations where a processor will have only one process. In further embodiments, processor 66 is a peer processor in a network of processors. Processes communicate with each other, regardless of the locations of two communicating processes through IPCF 72 in bus unit 50 and IPCF 74 in bus unit 52. Each pair of communicating processes is logically connected through IPCF by logical connections indicated by lines 80 in bus unit 50 and 82 in bus unit 52.

The establishment of connections is described in further detail in the above incorporated patent. In essence, an IPCF-Open verb establishes an IPCF connection between two processes. The connection is unique for each pair of processes communicating. Thus, each of lines 80 match to one of lines 82. Since there may be more I/O processors or host processors than shown in FIG. 2, more lines 80 than lines 82 would signify connections to processes in processors not shown. The Open verb, when issued by a process desiring to start a communication causes IPCF to create a logical connection between the process that issued the Open verb and the target process identified by the Open verb. The target of the Open verb is identified through an entity name. The Open verb establishes the connection to a new or already executing instance of a program based on the entity name supplied on the Open verb.

The Open verb comprises an entity name used by IPCF and the associated operating systems to determine the program in the server and executing instance of that program (i.e. process) to which the connection is to be made. A connection id identifies the connection that is returned by IPCF. It is used to refer to this connection on subsequent operations. A particular connection id is only known within a single processor. Two connected processes will in general have different connection ids for the same connection. Connection ids are assigned by the local IPCF and are unique within a processor. A return code is used by IPCF to indicate to the process completion of the Open verb.

A bus manager 86 is shown coupled to the host process 56 by a number of logical connections 80 already established. A similar bus manager 88 is shown in bus unit 52, also with multiple connections at 82. The bus manager 86 provides the same functions performed by the bus transport mechanisms (BTMs), indicated at 38 and 40 in the bus units of FIG. 1.

The bus managers 86 and 88 manage the connections, and issue messages to control the flow of work requests on the bus 54. Hardware supporting the bus indicated at 90 and 92 provide arbitration to the bus for each of the bus units, DMA capability to another bus unit's main storage, and a queueing of messages from the respective bus managers until control of the bus has been obtained to permit transmission of messages and data. The bus hardware also controls queueing of messages from the bus units in main storage queues.

The bus manager 86 receives a communication caused by an open verb being issued in bus unit 52. It then establishes a connection to the indicated process. Using information such as the identity of the target process (i.e.: the server process), the requesting process identity, the type of work a particular device performs, or other factors, the connection id for that connection is assigned to one of a plurality of connection groups labeled CG1, CG2, ... CGn. Some of the information is contained in the communication with bus unit 52. Other information is contained in main storage 58 and is accessed based on the information supplied by bus unit 52. The assignment is then based on that information, and preconfigured by developers in one preferred embodiment.

Connection groups are used to control the flow of work requests. Each work request requires system resources to process. If all work requests were served on a first come first serve basis, a number of high resource requiring devices would keep other devices from being able to be served.

One example of a device which requires a large amount of main storage resource is a tape drive device. In order to keep a tape device operating in streaming mode, its most efficient mode of operation, a large main storage buffer is required. If it is desired to attach multiple tape drives, and each requires large amounts of storage to buffer data when it is operating in a streaming mode, the assignment of sufficient resources to each tape drive would leave few resources available to be allocated to direct access storage devices. By combining the tape drives into one connection group, and allocating resources sufficient for only one or two to operate simultaneously, many more resources are available for direct access storage devices. A guaranteed level of support is provided for tape drive devices, and also for direct access storage devices. Since it is unlikely that five tape devices will be operating at the same time, there is no reduction in overall service.

Connection groups can also be used to ensure that resources will always be available for serving certain host processes. One example might be the placing of the server side connection between a host save/restore process and a corresponding I/O process into a connection group where that is the sole connection in that group. Thus, while the server process may have connections to other groups, resources will always be available for serving the host save/restore work request.

One basis for assigning groups are the operating characteristic of devices. Heavy data movers, such as tape drives, which also are only occasionally used, are put into one group. Devices such as direct access storage devices, which are heavily used in paging data into and out of main storage are put into another group, and a large amount of resources are allocated to the group to assure a high level of service. Other devices, such as work stations are put into yet another group. If there are sufficient resources available, each device has its own group.

When discussing devices being put into groups, it is a shorthand notation for stating that the connections to processes associated with the device are put into one group. Further assignment of connections into groups are made on the basis of the types of work requests that are being served. Connections relating to error condition handling and other maintenance related work requests may be put into yet another group by itself to guarantee a minimum level of service to such requests. It is seen that great flexibility is provided by the use of connection groups to allocate resources, and thus control the flow of work.

Figure 3:
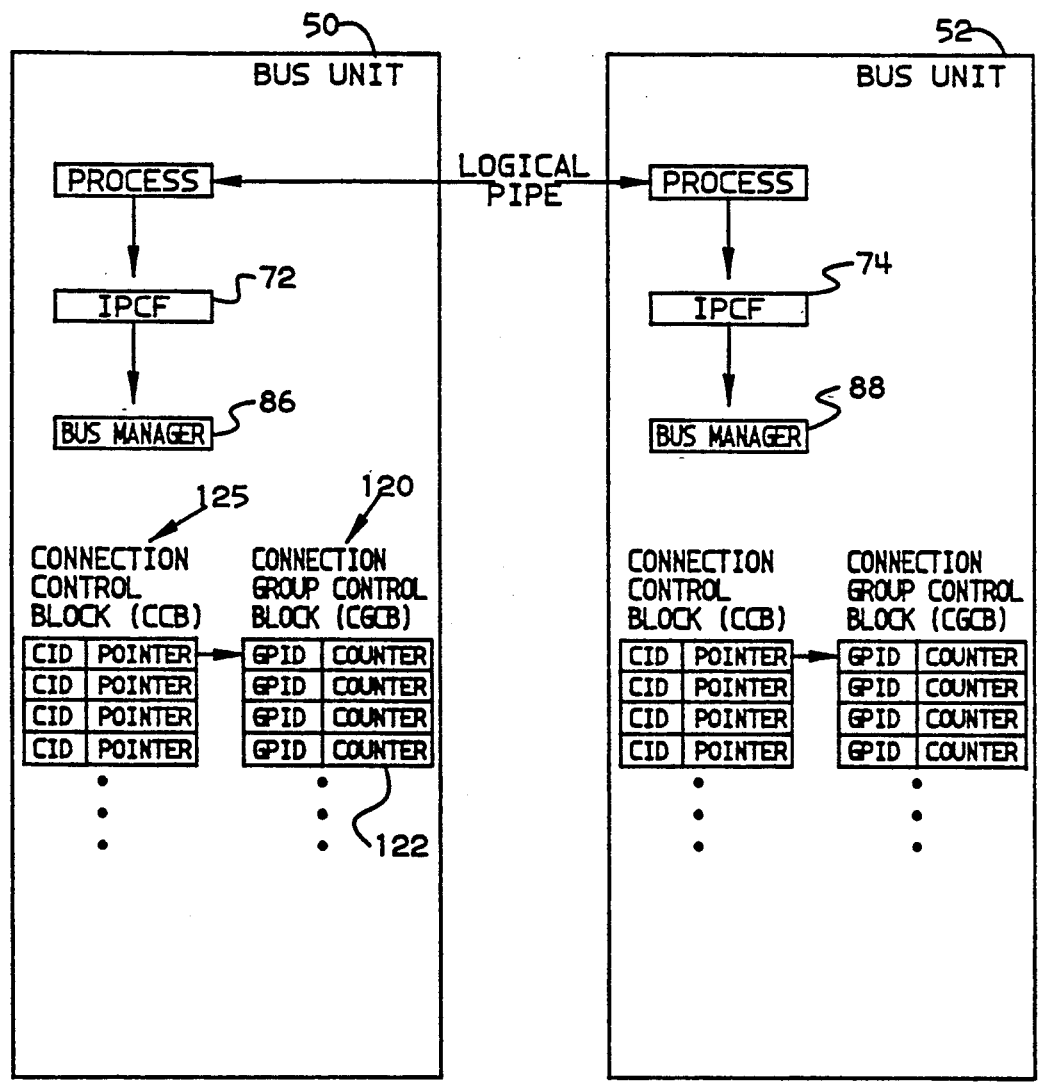
FIG. 3 shows a table and control block used in managing logical connections groups of FIG. 2.

In bus unit 50, when acting as a server, each connection group is listed in a control block 120 in FIG. 3 (the numbering is consistent with FIG. 2) in main storage 58. Control block 120 contains an entry for each connection group CG1-n labeled GP10 for Group 10. A count indicated in column 122 is associated with GPID entry which is used to keep track of the number of work requests received via a connection in the group, but which have not yet been served by a process in the bus unit 50. A table of active connection ids (C10) 125 have pointers to connection group entries at 120, and identify the group that a connection is a part of. Bus unit 52 has a similar mechanism for keeping track of the number of outstanding unserved work requests.

One of the benefits of the above flow of work requests is that work (for a single connection with the same priority) in a connection group is ultimately served in the order that it was requested by the requesting bus unit. Thus if multiple, priority requests to a process were generated to write data, it will be written in the order requested even if there was a time when resources were not available. All of this occurs transparent to the requesting process.

A flow diagram in a requestor bus unit is now described with reference to FIG. 4 and FIG. 5. Four queues are used to keep track of work requests which originated in the requestor bus unit. Each queue contains a pointer to the work request, a request id, and the corresponding connection group in the server bus unit which is communicated during the OPEN process. A ready-to-send-queue is used in the normal flow of work requests to point to queue work requests that are ready to be sent to server processors. When an OP START message is sent for a request in the ready-to-send-queue, the pointer is removed and placed on a waiting-for-response-queue. When an OP END message is received, the entry for the work request is removed from all queues. This normal flow is indicated by blocks A50, 152 and 154 in FIG. 4.

When a QUEUE FULL indication is returned in response to a work request, the pointer is moved from the waiting to complete queue to a reject queue at 156, and an indication that a QUEUE FULL message was received is associated with the connection group for which it was received. A Q SPACE FLAG for indicating that the connection group now has space available is then checked at 158. This flag is normally off, so the bus manager continues to send and receive communications. Each work request on the waiting to complete queue for which a QUEUE FULL indication is returned is placed on the reject queue in this manner.

Figure 5:
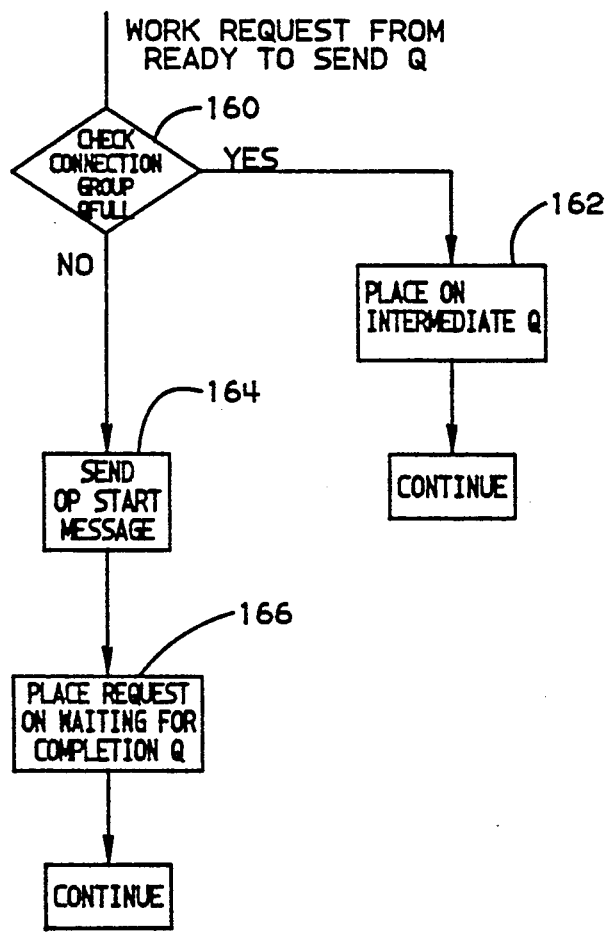
FIG. 5 is a further flow diagram of the requesting bus unit of FIG. 4 for responding to a Queue Full status.

In FIG. 5, when a bus manager is ready to send another OP START corresponding to the next entry in the reday to send Q, it checks for a connection group full indication for the connection group in the server bus unit at 160. If it indicates that the connection group queue is full, the entry for the request is placed on an intermediate-queue at 162. If it is not full, an OPSTART message is sent at 164, and the request entry is placed on the waiting for completion queue at 166.

Figure 4:
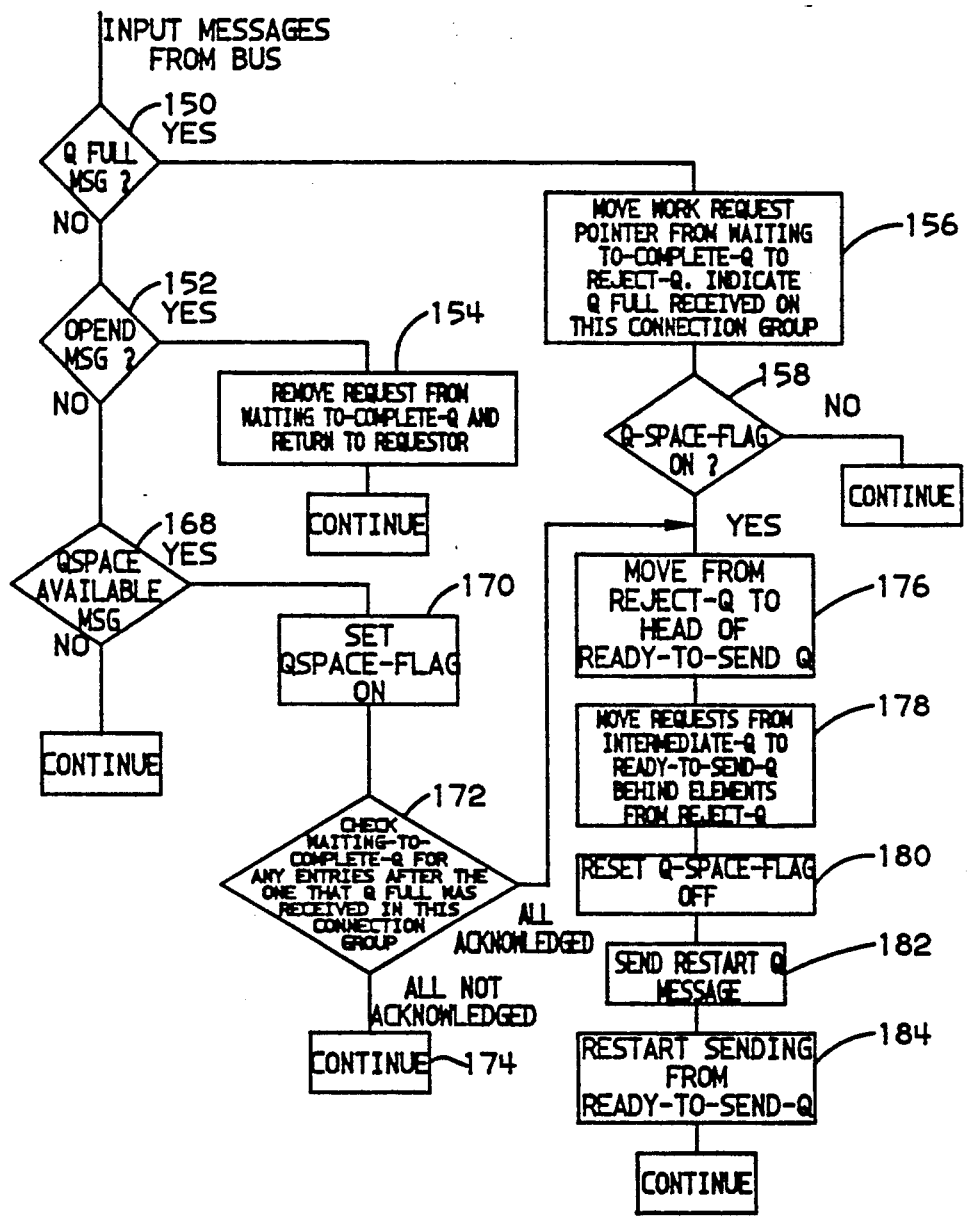
FIG. 4 is a block flow diagram showing a requesting bus unit responding to a Queue Full status for work requests destined for a connection group which does not have sufficient resource to accept more work requests.

Back in the flow of FIG. 4, when a Queue Space Available message is received by the requestor processor at 168, the Q SPACE FLAG is set on at 170, and the waiting to complete queue is checked for any entries after the one that QUEUE FULL was received for in the identified connection group. If queue full has not been returned for all requests waiting to complete, the bus unit continues to wait for the next communication at 174.

If all are acknowledged at 172, the entries are moved from the reject-queue to the beginning of the ready to send queue at 176. Then, request entries are moved from the intermediate queue to the ready-to-send-queue behind elements from the reject queue at 178, and the Q SPACE FLAG is reset at 180. A Restart Queue message is sent at 182, and the bus manager begins sending from the ready to send queue at 184.

Figure 6:
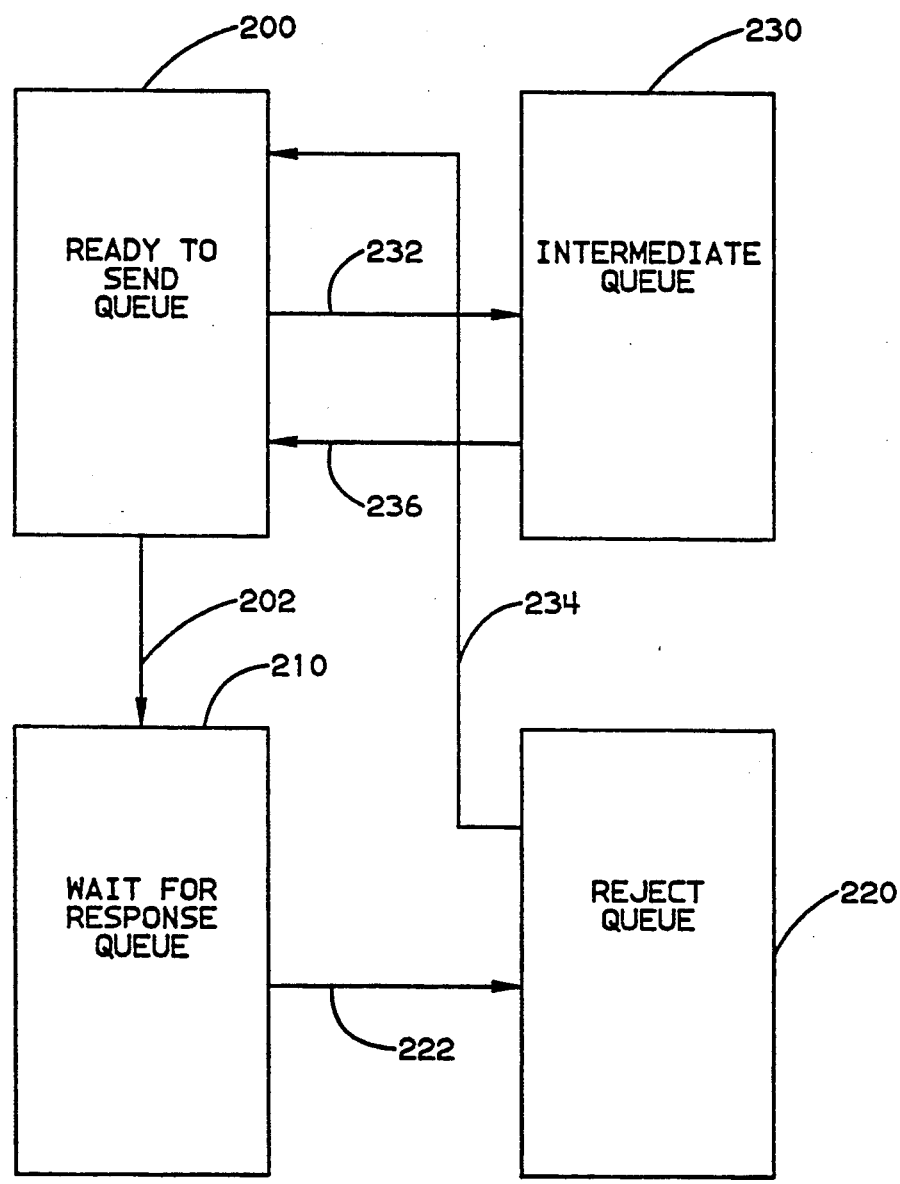
FIG. 6 is a block diagram of queues used by the requesting bus unit of FIG. 4 for responding to a Queue Full status.

In FIG. 6, the queues used by the above flow are shown, with the flow of queue entries corresponding to work requests shown by arrows. The ready to send queue 200 normally transfers entries by line 202 to the wait for response queue 210. If a QUEUE FULL status is received, entries are transferred from queue 210 to the reject queue 220 via a line 222. Meanwhile, as new work in queue 200 is being initiated, if a work request to a connection group already full is detected, it is transferred to the intermediate queue 230 via line 232. When all entries from the wait for response queue 210 which are intended for the full connection group have been transferred to the reject queue 220, and the Restart Queue message has been sent in response to a Queue Space Available message, the rejected requests are sent back to the top of the ready to send queue 200 via a line 234. Then, on line 236, other requests intended for the group which now has resources available for further work are transferred to the ready to send queue 200 behind the previously rejected requests.

Figure 7:
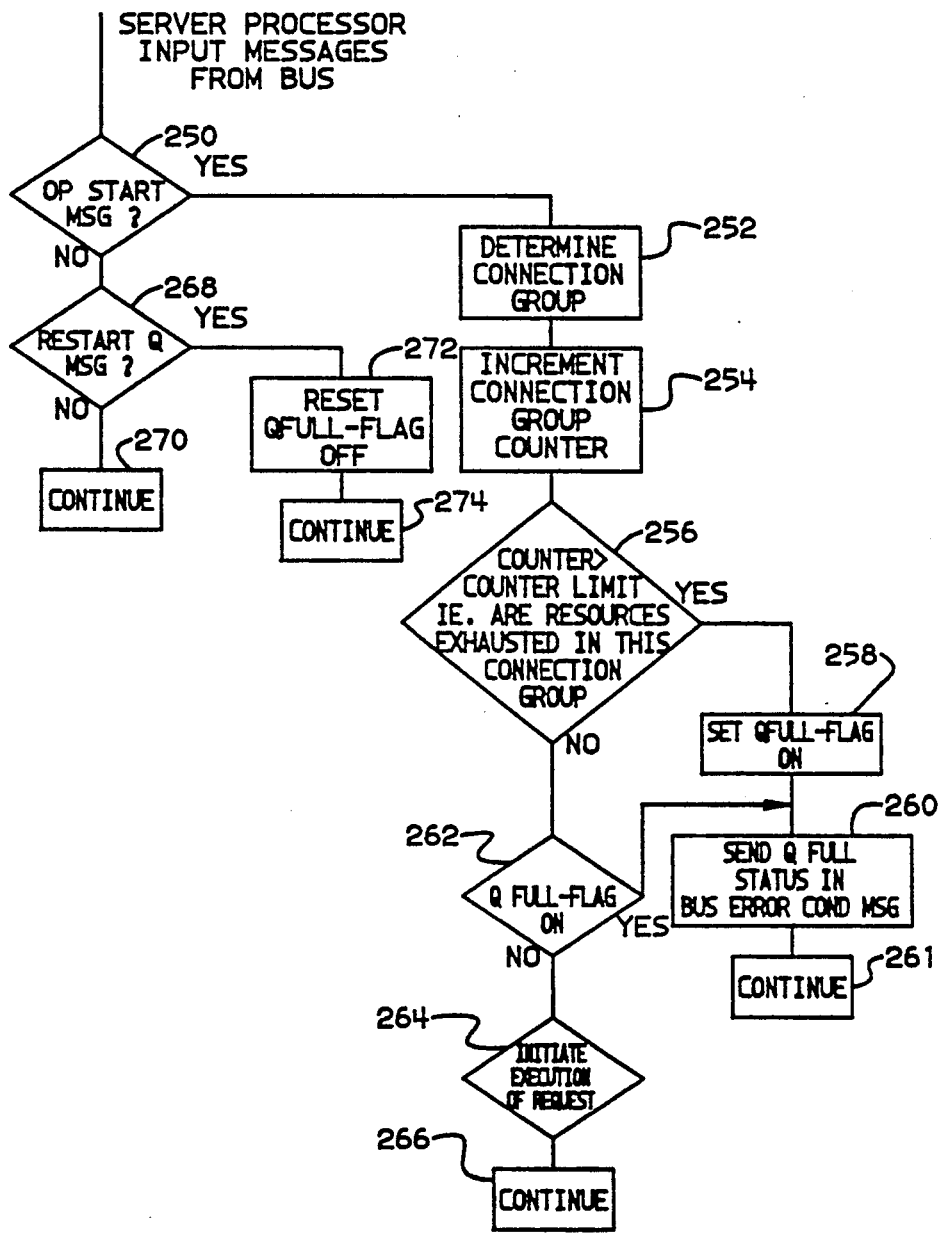
FIG. 7 is a block flow diagram of a server bus unit showing the flow involved in determining if there are sufficient resources available in a connection group, and sending a Queue Full message if there are not.
Figure 8:
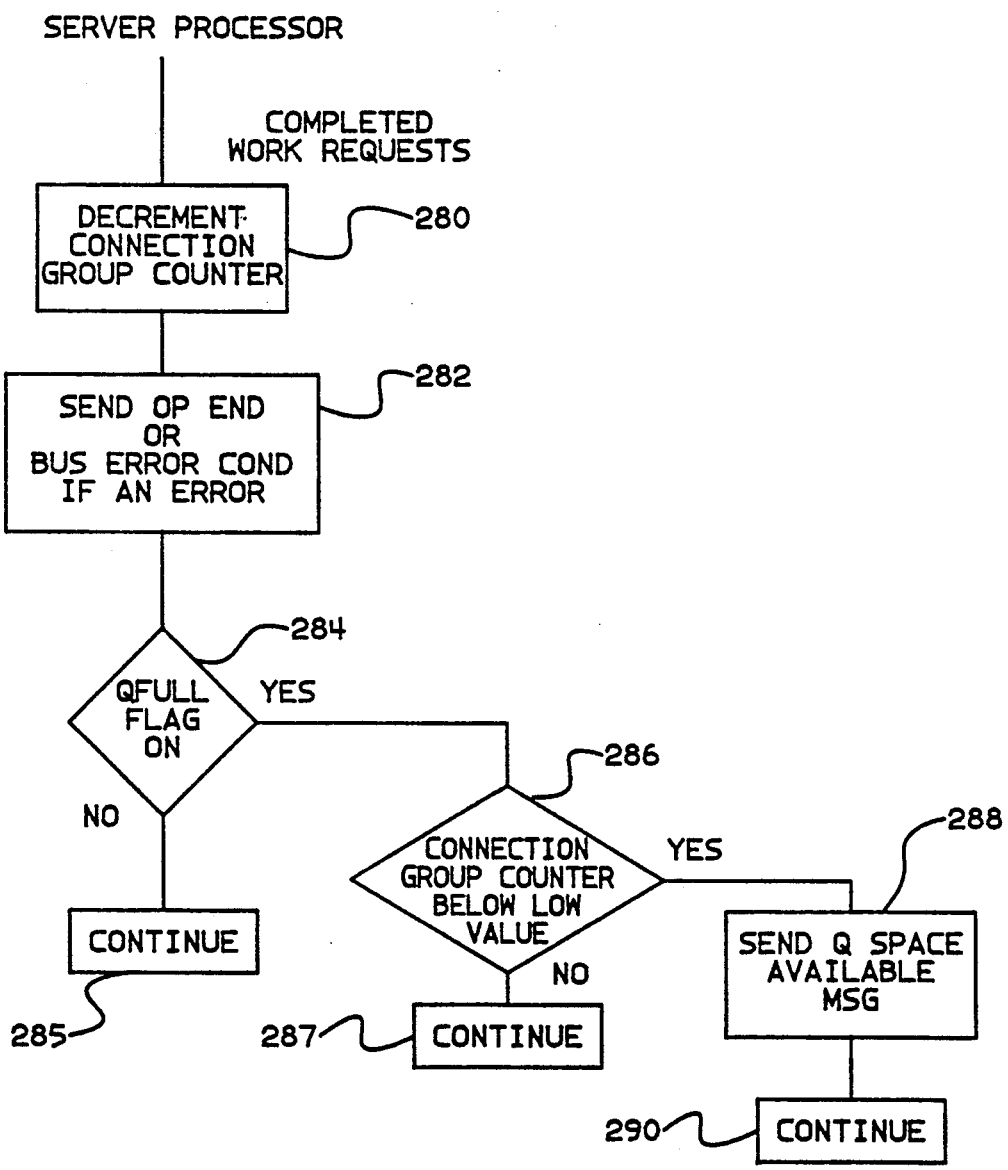
FIG. 8 is a further flow diagram of the server bus unit of FIG. 7 for determining when resources for a connection group have become available, and sending a Queue Space Available message.

Corresponding flow in the server bus unit is shown in FIG. 7 and 8. On receipt of an OPSTART message at 250 by a server bus unit, the connection group is determined at 252, and its counter is incremented at 254. A counter limit is used to define the number of work requests which a connection group may have outstanding at any one time. The value of the counter is compared to the counter limit at 256, and if the value is greater than the limit, a Q FULL FLAG is set at 258 and QUEUE FULL status is sent in a Bus Error Condition Message to the originating bus unit at 260, and processing continues at 261. In a further embodiment, actual resources available are monitored and compared to the resources required for a work request indicated by the OPSTART. If the counter is not greater than the limit, but the Q FULL FLAG is detected as on at 262, the flow returns to 260 and the QUEUE FULL status is sent in response to the OPSTART, otherwise, processing of the request continues at 264, and flow continues at 266. If the message received at 250 is not an OPSTART message, it is checked to see if it is a Restart Queue message at 268. If not, processing continues at 270. If it is a Restart Queue message, the Q FULL FLAG is reset to off at 272, and processing continues at 274.

To clear up a queue full condition, the server processor must either allocate more resources, and increase the limit of outstanding requests, or complete work on at least one of the requests on a full connection. This flow is indicated in FIG. 8. When a work request is completed, the relevant connection group counter is decremented at 280. Either an OPEND, or a Bus Error Condition message is sent at 282. The Q FULL FLAG is then checked at 284, and if it is off, processing continues at 285. If the Q FULL FLAG was set on, the connection group counter is checked to see if it is below the limit at 286. This limit, referred to as a "low value" in block 286 need not be the same as the previously discussed limit. It may be desirable to establish an even lower limit to ensure that sufficient resources will be available for a number of requests. This may help to eliminate a constant sequence of QUEUE FULL flows where multiple requests may be sent quickly following restart of the requestors queue. If the counter is not below the low value, processing continues at 287. If the counter is below the low value at 286, a Queue Space Available message is sent at 288, and processing continues at 290.

In one preferred embodiment, separate connection groups are defined in bus unit 50 for each communication protocol including connections to processes performing X.25, LAN, SDLC and other communication protocols.

Another group includes error handling process connections. Yet another group is for general maintenance process related connections.

A further group includes normal functions such as connections to processes involved in transferring data between a disk drive device controlled by bus unit 52.

Several variations in the number of connection groups is within the scope of the invention. Some processes may require a large volume of resource, so it may be desirable to have a single connection group for connections to each such process. The particular grouping of connections desired is dependent on the actual implementation, and the characteristics of the processes which are to communicate with each other.

The establishment of a connection between a process in host processor 56 and a process in I/O processor also 66 results in bus manager 88 completing the connection and assigning its processes connection to one of multiple connection groups CG1, CG2 . . . CGn. Thus, for each process in the system comprising the bus units, that has a connection to another process, the bus manager of the processor where the target process is located assigns its connection to a group, and allocates resources to the connection group to be used to serve work requests on the connection assigned to that group.

FLOW CONTROL BUS MESSAGES

Messages are transferred between bus managers to control and re-synchronize messages when a connection group does not have sufficient resources to service a request intended for a process connected to that group. When a target bus unit cannot accept additional work for a particular connection group, it returns a message with QUEUE FULL status specified. This status is contained within a Bus Error Condition message, whose format is shown in FIG. 9. The Bus Error Condition message is returned in place of a normal response to a request to report failures that prevent the successful completion or continuation of operations. Some other conditions for which the Bus Error Condition message is sent include, addressing errors on memory access requests, format errors, and receipt of undefined or unsupported messages. Several other conditions may call for the sending of this message dependent on the physical implementation of the bus transport mechanism.

A field labeled RESERVED in the Bus Error Condition message is reserved for future use. A BUS UNIT field is used to identify the source of the message. It is ignored for purposes of this invention. A third field, MESSAGE ID (82), is used to identify the message as a Bus Error Condition message. A CONTROL FIELD contains information to identify the unique request or connection experiencing a failure. The contents of this field depend on the failure and the particular transport message/DMA and flow method experiencing the failure. A CFID field identifies the content of the CONTROL FIELD. Different values indicate that the information in the control field is a requestor ID, or a server connection ID, or the address of a control block, etc. It is dependent on the reason the message was sent, and who sent it. An ACTN field identifies a recovery action to be taken. One value indicates that no action is to be taken, another requires initiation of closing a connection, another causes a reset to re-synchronize communications.

The QUEUE FULL condition is indicated in the ERROR STATUS field, which is followed by a CONN GROUP ID which identifies the connection group which was full. It indicates that the message was not executed by the addressed bus unit. The CONTROL FIELD will contain different values when the QUEUE FULL status is indicated. It may contain a control block address, or a requestor's ID dependent on the manner in which data was to be transferred. Different manners of transferring data will be described further in a flow control section of the present application. The ERROR STATUS field is also used to identify the status of other error conditions, such as those described above.

After sending a QUEUE FULL status to a source bus unit, the bus manager of the target bus unit which sent it monitors the appropriate connection group to determine when sufficient resources are available to serve the connection group.

When the target bus unit has space available in that particular connection group, it sends a Queue Space Available message to the source bus unit. The Queue Space Available bus unit message is used to indicate to the source bus manager that queue space is available. It is sent by a bus unit only after the bus unit has sent a QUEUE FULL status to the source bus unit. It indicates what connection group has queue space available. The format of the Queue Space Available message is shown in FIG. 10. There are four RESERVED fields, a MESSAGE ID field, and a GROUP field which uniquely defines the connection group for which there is queue space available.

The source bus unit will receive the Queue Space Available message and will determine the number of work requests which were sent to that particular connection group on the target bus unit. Since communications occur asynchronously, and there may be internal queue delays in the hardware of the source bus unit, the source bus unit may have already sent more messages to initiate work.

When the communications which should be sent again are identified, i.e.: those that occurred later in time than the message which caused the QUEUE FULL status to be returned, and were destined for the connection group that was full, the bus manager of the source bus unit issues a Restart Queue message. This message is used to ensure that no messages are taken out of order by the connection group in the target processor. If the connection group were to start taking messages immediately after issuance of a Queue Space Available message, it is likely that some work would be processed out of order. This would be work initiated by messages issued by the source bus unit prior to the source bus unit receiving the QUEUE FULL status, and which were received by the target bus unit manager after issuance of the Queue Space Available message.

The format of the Restart Queue message is indicated in FIG. 11. It is similar to the Queue Space Available message in that it identifies what type of message it is in the MESSAGE (0D)ID field, and identifies the connection group to restart its queue in a GROUP field. Until the Restart Queue message is received by the bus manager of the target bus unit, the bus manager returns the QUEUE FULL status for each message to start work.

MESSAGE FLOW EXAMPLES

Figure 12:
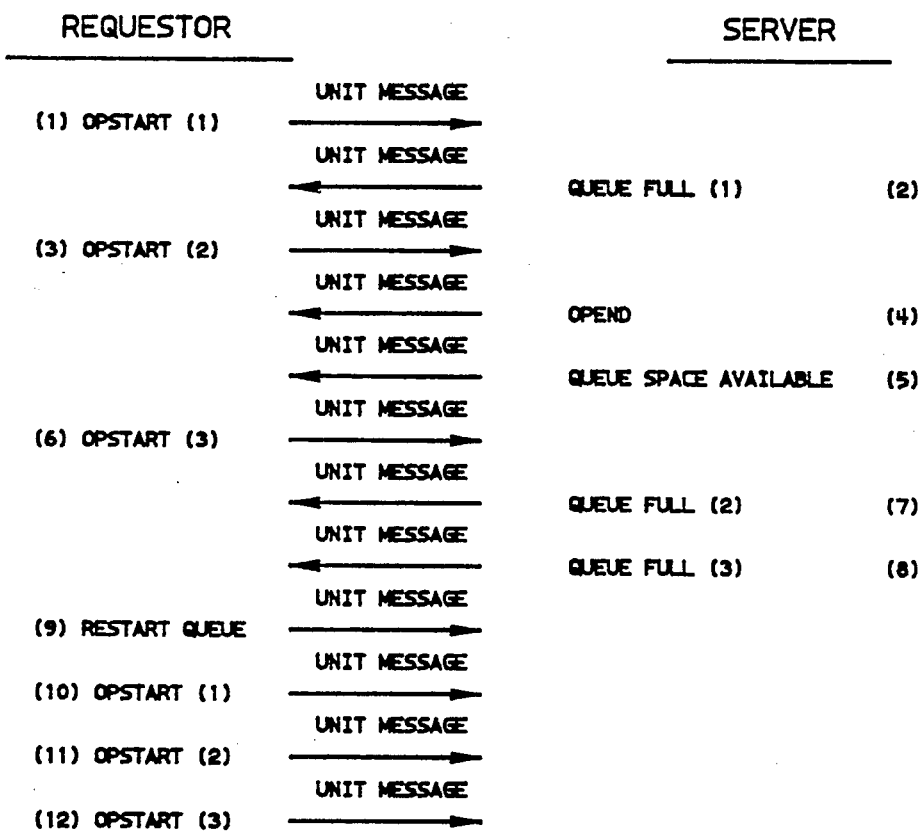
FIG. 12 is a diagram of the message flow involved in a queue full condition for a connection group.

In FIG. 12 an interchange of messages in response to a full queue for a connection group in a target bus unit is shown. The target bus unit is labeled as the server, and the source bus unit is labeled as the requestor. Messages sent and received by the server are shown on the server side of the Figure because that is where the flow is controlled. Arrows between the requestor and server point to the bus unit which received each message. The sequence of messages is indicated in numerical order. The events are now listed, in the order they appear in FIG. 12:

1. The requestor processor sends a message that initiates work, which is called an OPSTART(1) message, (defined later in this description) to the server processor.
2. The server processor has recognized a QUEUE FULL condition for the connection group that the OPSTART message was intended for, and returns an error message with QUEUE FULL status.
3. Because of the asynchronous nature of the bus units, the requestor is not yet aware of the QUEUE FULL status, and it sends a second message, OPSTART(2) to the server.
4. The server will have completed some previous work request, and will signal that to the requestor by sending an OPEND message.
5. Since the server has completed some previous work request, the server will have resources available or queue space available, and will send a Queue Space Available message to the requestor.
6. The requestor has not recognized the Queue Full condition because of hardware queueing delays in the requestor, and will send an OPSTART(3) message.
7. The server must continue to return QUEUE FULL status to the requestor until the server receives a Restart Queue message. It therefore returns a QUEUE FULL(2) status in response to recognizing the OPSTART(2) message.
8. The server now recognizes the OPSTART(3) message and returns a QUEUE FULL(3) message.

9. The requestor now recognizes the QUEUE FULL status for OPSTART (1), (2) and (3), and Queue Space Available message and sends a Restart Queue message after determining which messages it must resend, and the order in which to send them.

10, 11, and 12. The requestor processor resends the OPSTART messages in the correct order.

When work is completed by a server, an OPEND message is sent to the requesting bus unit to indicate that work has completed. Its format is described later.

DATA FLOW

In the preferred embodiment of FIG. 2, the bus hardware 90 and 92 of bus units 50 and 52 are labeled as having direct memory access (DMA) capability. This capability is a standard hardware capability that exists most hardware today. Master DMA capability allows the bus unit which has it to directly access the main storage of a bus unit with slave DMA capability without interrupting the processor in the slave DMA bus unit. Hence, the details of its operation will not be described, as they are not necessary for a full understanding of the invention.

Bus unit 50 has a slave DMA capability 90. In the preferred embodiment, bus unit 50 is a host processor. Slave DMA capability permits a bus unit to let other bus units access its main store 58 without interrupting the host processor 56. Thus, line 60, which gives host processor 56 access to main store 58 is also connected to bus manager 86, and to slave DMA hardware to permit 90 access directly to main store 58. This in turn permits another another bus unit, such as bus unit 52 which has master DMA hardware 92 capability to access main store 58 of bus unit 50 without interrupting host processor 56. A bus unit with only slave DMA capability cannot directly access the main store of any other bus unit, while a unit with only master DMA capability cannot enable any other bus unit trying to directly access its main store.

If a process in bus unit 52 sends a work request to a process in bus unit 50, the actual data transfers must be made transparent to the processes. IPCF 72 and 74 is the verb interface used by the processes to handle work. A server process will access data identified by the requestor at its own pace. Since the server bus unit in this case only has slave DMA capability, a means for obtaining the data transparent to both IPCF and the processes is provided.

In normal flow, where it is assured that each bus unit has full DMA capability, bus manager 88 would receive information from IPCF verbs from IPCF 74, which indicates that a process desires to send a work request. Bus manager 88 would then alert bus manager 86 that it has work to do by sending an OPSTART message. The OPSTART bus message format is shown in FIG. 13, and has sufficient information for bus manager 86 in server bus unit 50 to move a Request/Response Control Block (RRCB) that specifies control information and data addresses from bus unit 52 main storage 68 into main storage 58 in bus unit 50, if it could. Further detail of the RRCB is shown in FIG. 14 and 15. Bus manager 86, could then alert the intended process in host processor 56 through IPCF 72 that there is a pending work request, which would be queued by the process. The process would then execute the request, which would require data movement between the bus units. The copy of the RRCB, that would now be in main storage 58 would be used by the bus manager 86 to control the transfer of data between the bus units. The requested operation would be signalled complete by an OPEND (see FIG. 16) message being sent to bus manager 88, which would alert the requesting process through IPCF 74.

The problem with the above scenario is that as implemented in FIG. 2, bus hardware 90 cannot directly access main store 68. Even if bus hardware 90 had master DMA capability, bus hardware would have to have slave DMA capability as well. The problem is solved by using a storage list control block and several new bus messages to give management of buffers in main store 58 of host bus unit 50 to the bus manager 88 of bus unit 52. This permits the bus manager 88 in the requestor to transfer data related to the request to the buffers in main store 58 of the server, and then the server to transfer the data from the buffers into storage usable by the server process, in accordance with the normal flow of work. Thus, data flow appears normal to IPCF 72. The RRCB is used to indicate, as usual, where the data is that the server must access. The requestor bus manager 88 simply ensures that the data is located in buffers in main store 58. A more detailed description of the RRCB and messages will now be given.

A RRCB is shown in FIGS. 14 and 15. It is used to identify a work request, and the data associated with it. The RRCB is a control block that is used by the bus manager in the requestor bus unit and the bus manager in the server bus unit to control the movement of data between the bus units. Information in the RRCB is used for the physical DMA process. The contents of the RRCB are preferably read only. The contents are not altered or modified by the bus manager in the server bus unit.

The RRCB can be any length up to 4088 bytes in the preferred embodiment, as specified by the requestor's bus manager. In order to facilitate fixed block buffer management by the requestor, RRCB's can be segmented and chained together. If a fixed block is for example, 512 bytes long, and a RRCB is longer, an RRCB is segmented into a first type, which contains some header information, and a plurality of second type segments shown in FIG. 15, none of the segments being longer than the fixed block. The first field of the first type of RRCB is a length of the total RRCB in bytes. The length is the sum of the lengths of all of the segments RRCB. A RRCB TYPE field specifies that it is a first type RRCB segment. A SERVER CONNECTION ID specifies the identification of the target process for this request. A REQUEST PRIORITY field specifies the priority to be used by the server processor when inserting a request note onto the server process's input queue. A FLAGS field defines whether a definite response is required by the server, or only an exception response. A REQUESTOR RID field specifies the identification of the request. It is known only to the requestor.

An EXTENDED STATUS POINTER specifies an address of an area into which extended status (status data exceeding the architected size permitted for status) may be placed. This area must preferably be available and set to zero by the requestor bus manager prior to usage. The address is for the same storage as the RRCB in the requestor managed storage.

The remainder of the first type segment is identical to type two segments. It consists of a plurality of descriptor element words which specify the type of data described by the descriptor element in the DATA FLAGS field. A descriptor type in the DATA FLAGS field identifies the descriptor type, such as Request, Data In from server storage to requestor storage, Data Out to server storage from requestor storage, or a segment link to the next RRCB segment when a further segment is required. The RRCB segment link descriptor element must appear at the end of the RRCB segment if there is another RRCB segment. A descriptor format field within the DATA FLAGS field is used for specifying that immediate data is left justified starting in the data word and continuing for a maximum of 44 bytes. A request or Data Out descriptor may be immediate data or a reference including the bus unit number and data address to identify where to DMA data to or from. A bus unit number must always appear when the reference descriptor format is specified. The DATA FLAGS field identifies the bus unit, by bus unit number, that the address in the next field refers to.

A DATA LENGTH field specifies the length of the data, in bytes, of the field specified by the following address field. It is an unsigned integer value which specifies contiguous real storage. The data is padded with zeros to a multiple of 8 bytes.

A DATA ADDRESS/DATA field is used either as an address or immediate data. This field is immediate data if immediate data is specified in the DATA FLAGS descriptor format of the previous word of the RRCB segment; otherwise it is an address. The address could be in the server's storage, the requestor's storage, or a third bus unit's storage which is not shown. The address is used by the server bus manager for DMA operations to or from the storage in the other processor, or in a requestor controlled buffer in the server storage.

BUFFER MANAGEMENT MESSAGES

Buffer management is passed between two bus managers. One bus unit will provide remote storage in its main storage to be used and managed by the other bus unit. In this embodiment, bus unit 52 that has management of buffers in main store 58 which is tightly coupled to host processor 56. Bus unit 52 remote processor 66 can use the remote storage in main store 58 for any purpose to meet its requirements. The remote storage may be viewed by the remote processor as a logical extension to its own storage.

Bus unit 52 makes a request for remote storage with a Storage Request bus unit message sent by bus manager 88. The format of the Storage Request message is indicated in FIG. 17. Soon after normal system bring up, this message is used to obtain remote storage in the host by a bus unit.

The Storage Request bus unit message will also be sent when the remote processor does not have any further buffers available. The length of the requested buffers is specifiable in a LENGTH OF BUFFERS field. The local processor may not provide the buffer size requested, but will satisfy the request if buffers of a larger size are provided. Smaller size buffer will not be provided. A number of RESERVED fields are indicated, and are specified as zero. A MESSAGE ID (06) field identifies the message as a Storage Req bus unit message. The STORAGE SIZE field is the length in bytes of the requested storage. In the preferred embodiment, the maximum storage that can be requested in a single message is 65535 bytes. A LENGTH OF BUFFERS field specifies the minimum length of buffers being requested. Thus, while the total storage size requested may not be satisfied, if even one buffer is provided, it will be at least as long as the value of the LENGTH OF BUFFERS field.

A Storage List Available bus unit message and a Storage List Control Block (SLCB) is sent by the bus manager in the local bus unit, in response to a Storage Request bus unit message. The SLCB provides a list of buffers in the storage of the local bus unit that can be used by the remote bus unit. Only one Storage List Available/SLCB is sent in response to a Storage Request, and only in response to a Storage Request.

The format of the Storage List Available bus unit message is shown in FIG. 18. A FLAG field indicates the type of response, such as storage is available, resource not available and no storage is provided, or buffers are not available as large as requested and none were provided in response to the request. A MESSAGE ID (07) field identifies that this is a Storage List Available bus unit message. An ADDRESS OF STORAGE LIST CONTROL BLOCK field specifies the real address of the SLCB in the bus unit storage containing the remote storage. This field is only valid if the FLAG field value indicated that storage was available. A LENGTH field indicates the length of the SLCB in the local bus unit storage.

The SLCB format appears in FIG. 19. A BUS NUMBER field specifies the bus number that this bus unit appears on in the local bus unit. There may be up to eight different busses in the preferred embodiment. The BUS UNIT field specifies the bus unit number of the remote bus unit to which this SLCB is directed. The number of buffers, and their lengths are specified in the next two fields. It is the responsibility of the sender in the local bus unit to insure that this field agrees with the LENGTH field in the Storage List Available message.

The bus manager in the bus unit containing the remote storage manages a portion of the main storage on the same bus unit. It keeps track of buffers in main storage, and grants control to other bus units requesting main storage. Thus connections and other bus units contend for buffers in the main storage through the bus manager.

A BUFFER ADDRESS field is used to specify the real storage address in the local bus unit of the buffers. This is repeated as many times as required to satisfy the number of buffers specified in the NUMBER OF BUFFERS field.

A Storage List Complete bus unit message is sent by the bus manager of the remote bus unit to indicate that the remote bus unit no longer requires access to the remote storage specified by the SLCB. The return of remote storage may also be initiated by the bus unit with slave DMA capability that made storage available to another bus unit with master DMA, with a Return Storage List bus unit message to indicate that unused buffers should be returned. The Storage List Complete message is also used to indicate that the request specified in the Return Storage List cannot be satisfied.

The format of the Storage List Complete message is indicated in FIG. 20. A FLAG field specifies normal return of a storage list, or a rejection of the Return request. It can indicate that a normal return is made of the entire list, that a return is made in response to a Return Storage List message, that a return of a specific size buffer indicated in a Return Storage List message is being made, or that the requested storage was found, but is required for use and cannot be returned.

The ADDRESS OF STORAGE LIST CONTROL BLOCK field is the real address of the SLCB in the local processor. When the Return Storage List contains a length of buffers, and the buffers are not being returned in the Storage List Complete message, a LENGTH OF BUFFERS field contains the length of the buffers as specified in the Return Storage List.

The Return Storage List message format is shown in FIG. 21. The requestor can specify that any storage list with the buffer size requested be returned, or can identify a specific storage list to be returned. The FLAG field of this bus unit message indicates if any storage list with the specified size of buffers or a specific storage list is to be returned. The indication of the control of the storage list being passed from the remote bus unit control to the local bus unit control is by the Storage List Complete bus unit message as described above. The MESSAGE ID (09) field identifies the message as a Return Storage List message. The ADDRESS OF REQUESTED STORAGE LIST field specifies the address of the storage list to be returned if the FLAG field indicates that a specific list is requested. A LENGTH OF BUFFERS field specifies the length of the buffers to be returned with this request if no specific storage list is requested.

Figure 22:
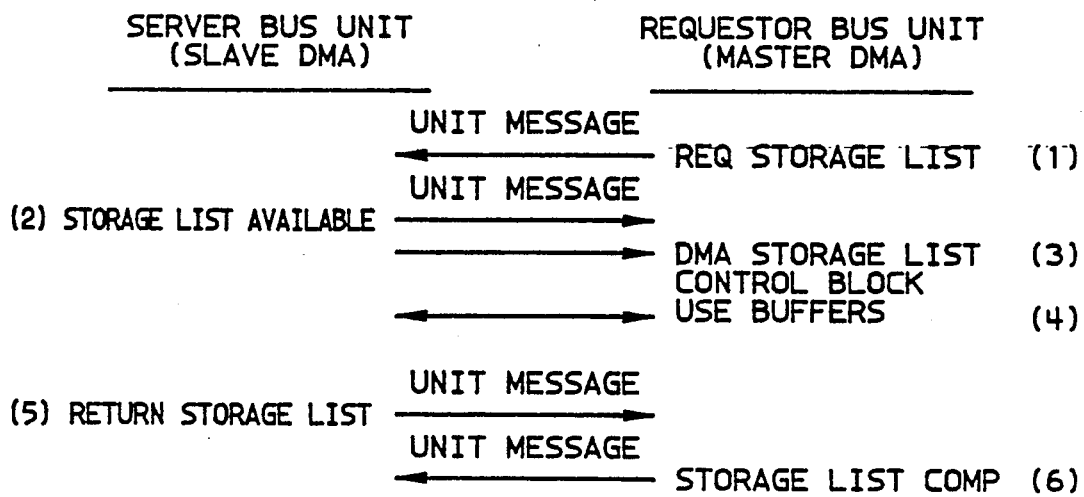
FIG. 22 is a diagram of the message flow involved in transferring control of management of remote storage.

In FIG. 22, a simplified version of the flows involved with storage lists is presented. A requestor bus unit with master DMA is represented on the right side of the figure, with messages listed below it. A server bus unit with slave DMA is represented on the left side of the figure. The operations are described and identified as steps 1 through 6 as follows:

1. The bus manager in the requestor processor, with master DMA capability signals the server processor that it requires buffers by sending a Request Storage List message.
2. The bus manager in the server processor sends a message that indicates that a storage list control block SLCB is available for the requestor processor.
3. The remote bus DMAs all or part of the SLCB into its storage.
4. The bus manager in the requestor processor uses the buffers as desired.
5. The bus manager in the server processor wants to do some type of shut-down, such as end-of-day or because a bus unit had a peak load, which has passed, and the bus unit now has resources (storage) that are no loner required to service its load. The bus manager sends a Return Storage List message to the requestor processor.
6. The bus manager in the requestor processor sends a Storage List Complete message indicating the SLCB that is no longer required.

Figure 23:
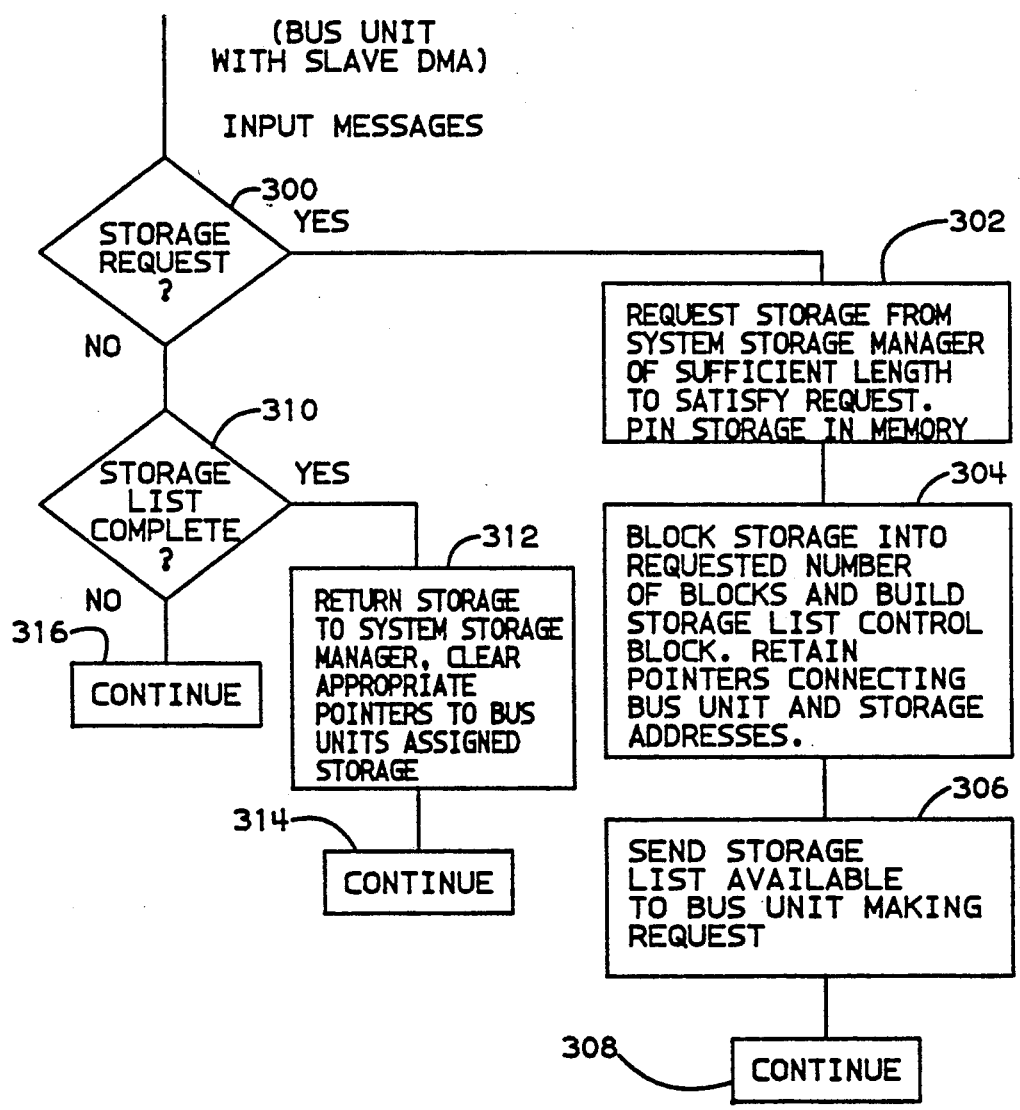
FIG. 23 is a block flow diagram showing the granting of management of remote storage.

In FIG. 23, when a bus manager of a bus unit having only slave DMA capability receives a communication over the bus, it checks at 300 to determine if the communication is a storage request. If it is, then as indicated at blocks 302, 304, and 306, the bus manager requests main storage from the system storage manager to satisfy the request using well known storage management techniques. The bus manager pins the storage granted to identify that it has management responsibility for that storage. Management responsibility includes the ability to read and write to the storage with some level of assurance that another bus unit will not use the storage independently. It then blocks the storage into the requested number of blocks, and builds the storage list control block, retaining pointers connecting the bus unit requesting the storage to the storage address of the blocks granted. The bus manager then sends the storage list available message to the requesting bus unit, and continues processing at 308.

Back at block 300, if the bus communication is not a storage request, the communication is checked to determine if it is a storage list complete message at 310. If it is, the storage identified is returned to the system storage manager at 312, and the pointers to the bus unit returning the storage management are deleted. Processing continues at 314. If at block 310, a storage list complete message is not detected, processing continues at 316.

Figure 24:
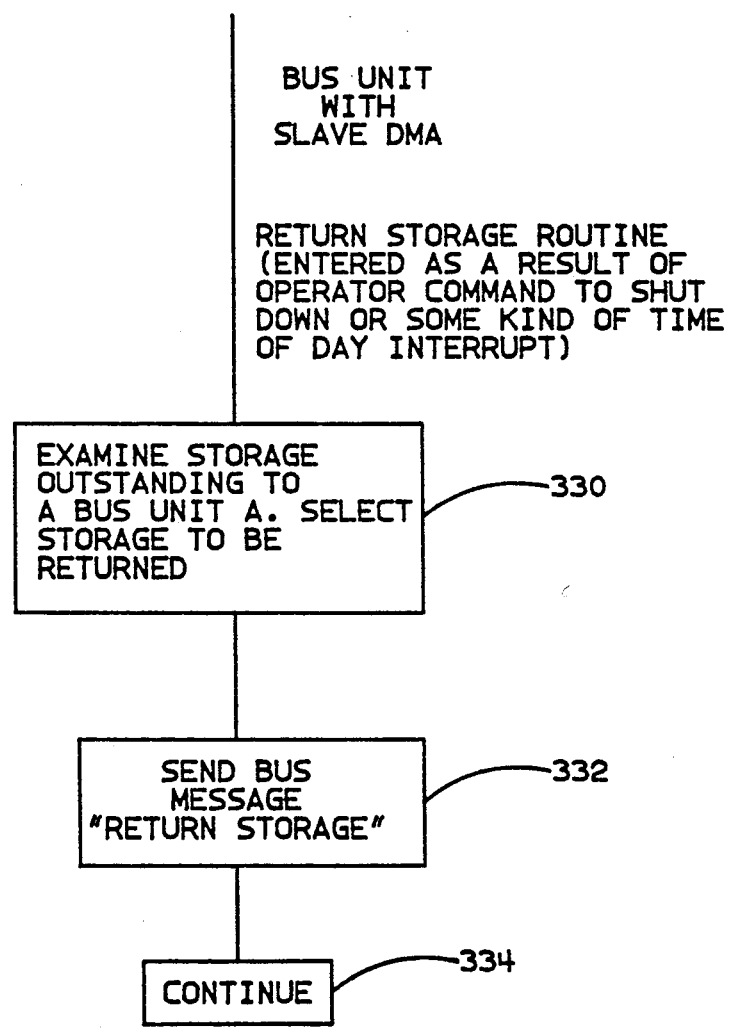
FIG. 24 is a block flow diagram showing the return of management of remote storage.

If a request is received by the bus manager of the bus unit with slave DMA only which indicates that the host itself would like storage returned, the flow indicated in FIG. 24 is entered at block 330. Such a request may be generated as a result of an operator command to shut down, or perhaps by some type of time of day interrupt. In any event, the bus manager, upon receiving the return storage request examines storage which is pinned due to its being managed by another bus manager, and selects storage to be returned. The bus manager may keep some type of statistics on the amount of use, or the request may specify the type of device to be shut down. In this manner, the bus unit is selective in the storage that it requests to be returned. At 332, a bus message is sent to the desired bus unit to return the storage. The bus unit will return a Storage List Complete message to comply as indicated in the flow of FIG. 23. Processing then continues at 334.

The remote storage management mechanism can also be used to balance system performance. If a bus unit does not have adequate main storage, it can request buffers in host main store to use. Given adequate bus performance, the performance at the bus unit can be enhanced. The system can easily track performance of other bus units and allocate more remote storage to those bus units which are slow to respond to work requests. The amount allocated must be offset by the potential drop in performance of the host if too much of its main storage is remotely managed.

REVERSE FLOW

As discussed above, the normal flow of work requests is from the host processor 56 to the I/O processor 66. They include work such as reading and writing data to secondary storage devices coupled to the I/O processor 66, or initiating communications through the I/O processor 66. Having an I/O processor 66 with master DMA capability and a host processor 56 with slave DMA capability is ideally suited to this relationship. The server being the I/O processor drives the transfer of data without interrupting the host.

Figure 25:
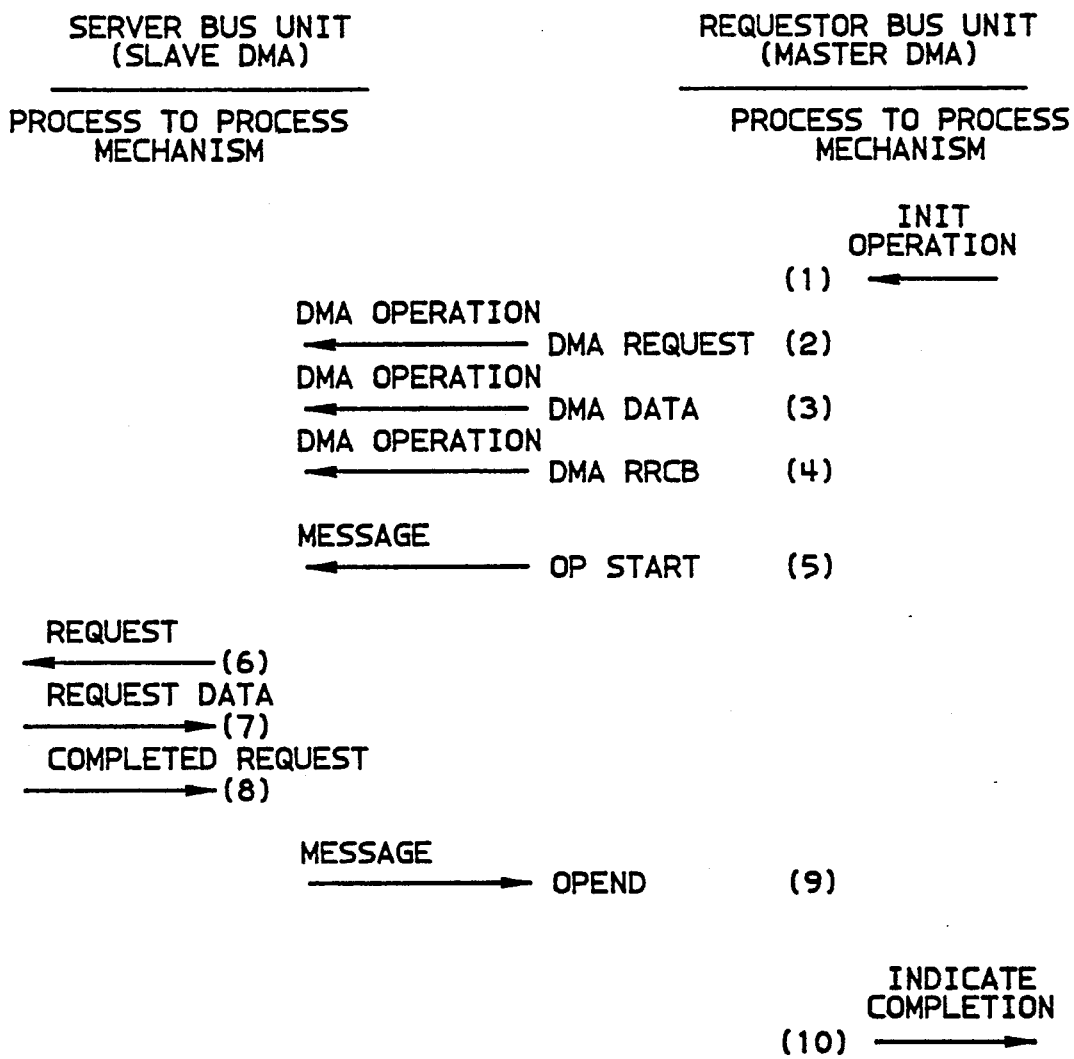
FIG. 25 is a diagram of the message flow involved in reversing the flow of data associated with a work request.

It has become common for the I/O processor 66 to have a process which sends a work request to the host. This results in a reverse flow of the data associated with the work. Since the host cannot DMA the data from the I/O processor, the I/O processor uses the remote buffers obtained in the host main storage by use of the messages discussed previously. An example of a reverse flow is now described with reference to FIG. 25. A requestor bus unit with master DMA capability, I/O processor 66, performs steps indicated on the right side of the figure, and a server bus unit with slave DMA capability, host processor 56 performs steps indicated on the left side of the figure. The steps, numbered 1 through 10 are described:

1. The requestor process issues a request at the process to process verb interface to the process to process mechanism, IPCF 74 in FIG. 2.
2. The bus manager 88 will obtain a buffer of adequate size in the host processor main store 58 if it already does not have one, and initiates a master DMA operation through bus hardware 92 to move the request into remote storage in the server storage bus unit 50.
3. The request bus manager 88 DMAs data into the buffer.
4. The bus manager 88 will then DMA the RRCB into the buffers in the server's storage. The RRCB at this point uses addresses in the servers storage of the request and data that were DMA'd into the remote storage in the server bus unit in steps 2 and 3.
5. The bus manager 88 in the requestor processor 66 sends an Opstart bus unit message to the server processor indicating that the RRCB and data are in the server storage. At data associated with the process using the process to process mechanism has been DMA'd into the server's storage.
6. The request is passed to the server process by the process to process mechanism 72.
7. The server process requests the necessary data, which is in the storage local to the server. The bus manager 88 still has control of the buffers but bus manager 86 has access to these buffers while processing the Opstart message. The bus manager 86 of the server process transfers the data into an area of main store 58 which is accessible to the server process.
8. When the server process has completed the requested operation, the process to process mechanism 72 is notified by use of IPCF verbs.
9. The bus manager 86 in the server processor 56 issues an Opend message with the status information. This informs the bus manager 88 in the requestor processor 66 of any response put in the buffers by bus manager 86. After retrieving such response, the bus manager 88 frees the buffers for further use and indicates to the requesting process that the requested operation has been completed.
10. The process to process mechanism 74 then notifies the requesting process that the operation has been completed.

Reverse Flow by Signal Messages

Figure 26:
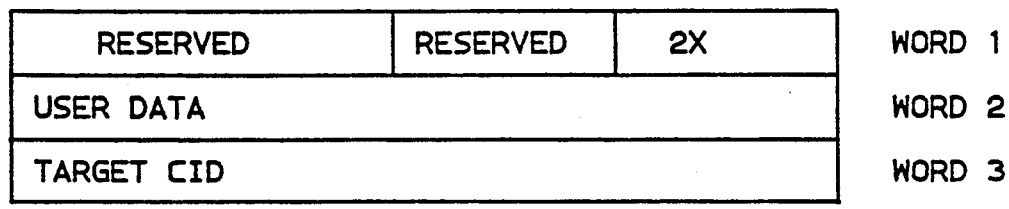
FIG. 26 is a block diagram showing the fields of a Signal bus message used to informally transfer small amounts of data.

A Signal bus unit message format is shown in FIG. 26. The Signal bus unit message is generated by a bus manager, and is used to transfer small messages to a process in another processor. One use includes an up to 4 characters at a time data transfer. It is not required by the bus manager that sends the Signal that the receiver of a signal bus unit message send a response. There could be a response at a higher level protocol between the requestor and a server process, but none is required by the bus manager in the preferred embodiment. The sender of a Signal cannot guarantee that it is received by the server bus unit. No flow control mechanism exists for Signal messages. There is no bus manager mechanism to notify the sender that a Signal can not be executed because, for example, the receiving process could not obtain storage. This allows flexibility if no response is required. There is less overhead with the use of a signal message as opposed to a work request. An RRCB is not required.

The Signal includes two reserved areas which are zero in the preferred embodiment. The 2X field type is used to define the type of bus unit message.

The 2 in the field defines this as a Signal bus unit message. The X specifies the content of the USER DATA field. The following are the types of Signal messages:
20—Attention (to alert the recipient)
21—Immediate data—1 byte
22—Immediate data—2 bytes
23—Immediate data—3 bytes
24—Immediate data—4 bytes
25—Immediate error data
26—Immediate user type 1 data
27—Immediate user type 2 data
28—Immediate user type 3 data
29—Immediate user type 4 data
2A-2F—reserved for future use.

The USER DATA field of the message contains user defined data i.e. the immediate data. The immediate data in the field is preferably left justified. A TARGET CID field identifies the target process for this bus unit message.

A variation of the Signal is used to provide a mechanism for reversing the responsibility for transferring work requests and associated data originating from the bus unit with master DMA to instead be transferred by the bus unit with master DMA. A different form of the Signal is used, as shown in FIG. 27, as an alternative to remote storage. It is an easy to implement version of reverse flow, but does not provide the same guarantees that the remote storage version of reverse flow provides.

When an I/O bus unit needs to initiate a request to a reliability/availability/serviceability RAS type process in a host bus unit, it sends a Signal message of the format indicated in FIG. 27. USER DATA is defined as a two byte LENGTH field which indicates the length of a record to be retrieved, and a two byte OFFSET. The OFFSET field is an encoded value assigned by the I/O bus unit and is used as a tracking mechanism to associate a Signal message with the work request generated in response to one of three types of Signal messages. The types corresponding to I/O bus unit work requests are defined below:
26—Type 1 Request—ERROR DATA
27—Type 2 Request—RESOURCE DATA
28—Type 3 Request—TEST DATA
Other types could easily be identified.

The RAS type process is called to retrieve the Type Request from the I/O bus unit. It returns the Signal TYPE, OFFSET and LENGTH field values in the request. The I/O bus unit returns the identified Type Request command and the associated data in response to the request. The format of each of these Type Requests will be as though it had been sent using the prior reverse flow method or by normal flow.

One example of the use of this reverse flow method is in retrieving error data. The host that received the Signal is responsible for sending the work request to retrieve the command bytes and associated data. The following work request fields contain the given Signal message fields:
TARGET—Signal TYPE
ADDRESS—buffer OFFSET
GETMAX—Signal LENGTH
The I/O bus unit will then return the next available entry in FIFO order from the one of the requested queues for the processes corresponding to the Type 1, 2, or 3 requests.

The LENGTH field specifies the length of the data that the I/O bus unit will return. For example, the maximum length that could be returned given the type of Signal sent is 268, 272 or 48, respectively for the Type 1, 2, and 3 request in the preferred embodiment. However, the actual length of the work request in the I/O bus unit in bytes plus associated data may be less. The I/O bus unit work request specifies the actual length of associated data.

Since the Signal message may be lost due to system queueing limitations or error conditions, a minimum system queue size to handle messages is recommended. At least 17 signals for Type 1 requests, 24 for Type 2 requests and 16 for Type 3 requests will handle most situations without loss of Signal messages. These numbers are very dependent on the particular type of bus unit resource support, and are presented here as a preferred embodiment for a direct access storage controller bus unit.

The numbers given are the number of entries in the I/O internal buffers containing the I/O bus unit work requests. If entries are not cleared from those buffers with the host's work request, and the buffers are full, an error data type will be sent. The Signal OFFSET value is used as a tracking method to determine whether a Signal has been lost. Host work requests which contain an unexpected offset value indicate loss of a signal message. The signal message will then be resent by the I/O bus unit. The response to the host's request contains an error code indicating the host bus unit should discard the request. The same tracking method also provides a correlation to handle timing conditions where the requested record has already been sent.

The host work request contains the following information:

| Byte | Description |
|---|---|
| 0-1 | Command Length |
| 2 | Command Qualifier |
| 3 | Command Code = X'23' |
| 4 | Modifier |
|  | bits 0-1 - Access Mode = '00' |
|  | bits 2-7 - Reserved |
| Address field is offset from specified target. |  |
|  | bits 2-7 - Reserved |
| 5-7 | Reserved |
| 8-15 | Address: Offset - Right justified with leading zeros |
| 16-23 | Target |
|  | Byte 16: Signal Type |
|  | Bytes 17-23: Reserved |
| 24-27 | Activation ID = Bus unit Resource ID |
| 28-31 | GETMAX = LENGTH from Signal |

When the response to the host request is returned from the I/O bus unit, it contains the following information describing the data associated with the request:

| Byte | Description |
|---|---|
| 0-1 | Command Length |
| 2 | Command Qualifier |
| 3 | Command Code (Associated with Signal Type) |
| 4 | Modifier |
| 5-(n-1) | Command Text (n = Command Length) |
| n-L | Data (L = Length of Data In Descriptor) |

REVERSE FLOW BY DMA REQUEST

Yet a further way to reverse the control of data flow is the use of a pair of bus unit messages presented in FIG. 28 and FIG. 29. A bus unit message DMA Req (FIG. 28) is sent by the server bus unit to the requestor for requesting a DMA into its storage. A bus unit message DMA Comp (Fog. 29) from the requestor bus unit indicates that the DMA operation is complete. The requestor bus unit, the bus unit with the master DMA, performs a service for the server bus unit. The bus manager in the requestor bus unit does not know which CID caused this particular request for service.

An example would be when the bus manager in a server bus unit received an Opstart bus unit message. It then sends a DMA Req bus unit message specifying the address of the RRCB in the requestors storage and the location to place it in the servers storage. The requester bus unit would perform the service and notify the other bus unit that the operation has been completed by a DMA Comp bus unit message. The bus manager that receives the DMA req performs the requested service without knowledge of the real requestor of the service. It is doing a service for the other Bus Manager.

The DMA Req has the following fields:

RSVD is reserved and must be zero.

LENGTH is the length of the data to be transferred with this DMA Req operation.

DMA ID is the ID to be used for this DMA Req and must be returned in the DMA Comp bus unit message to identify this particular DMA request. This identification has no meaning beyond this DMA request and the DMA completion bus unit message.

Type ID (OX) is used to define the type of bus unit message and the direction of the DMA. A DMA Req has two possible Hex values:

'03'—From requestor processor to server processor
'04'—To requestor processor from server processor The DATA Address in requester processor field is the starting address in the requestor storage of the data transfer. The direction of data transfer is specified by the type field. This could be the address of the RRCB that was obtained from the Opstart bus unit message or data field address obtained from the contents of the RRCB.

The DATA Address in server processor field is the starting address in the server storage of the data transfer. The direction of data transfer is specified by the type field.

When the requestor has completed the requested DMA operation it notifies the server that the operation is completed. This is done by sending a DMA COMP (DMA Complete) bus unit message in FIG. 29. If a bus error occurs when the server processor is executing the requested DMA operation a BUS ERROR CONDITION bus unit message is returned rather than a DMA COMP bus unit message.

The fields of the DMA COMP bus unit message are as follows:

A RESERVED field must be zero.

DMA ID is the ID that was provided in the DMA Request and is used to identify the requestor of this particular DMA request.

Type field (05) is used to define the type of bus unit message.

Two further RESERVED fields must be all zeros.

The sequence which started with an Opstart bus unit message will be completed with an OPEND bus unit message.

Figure 30:
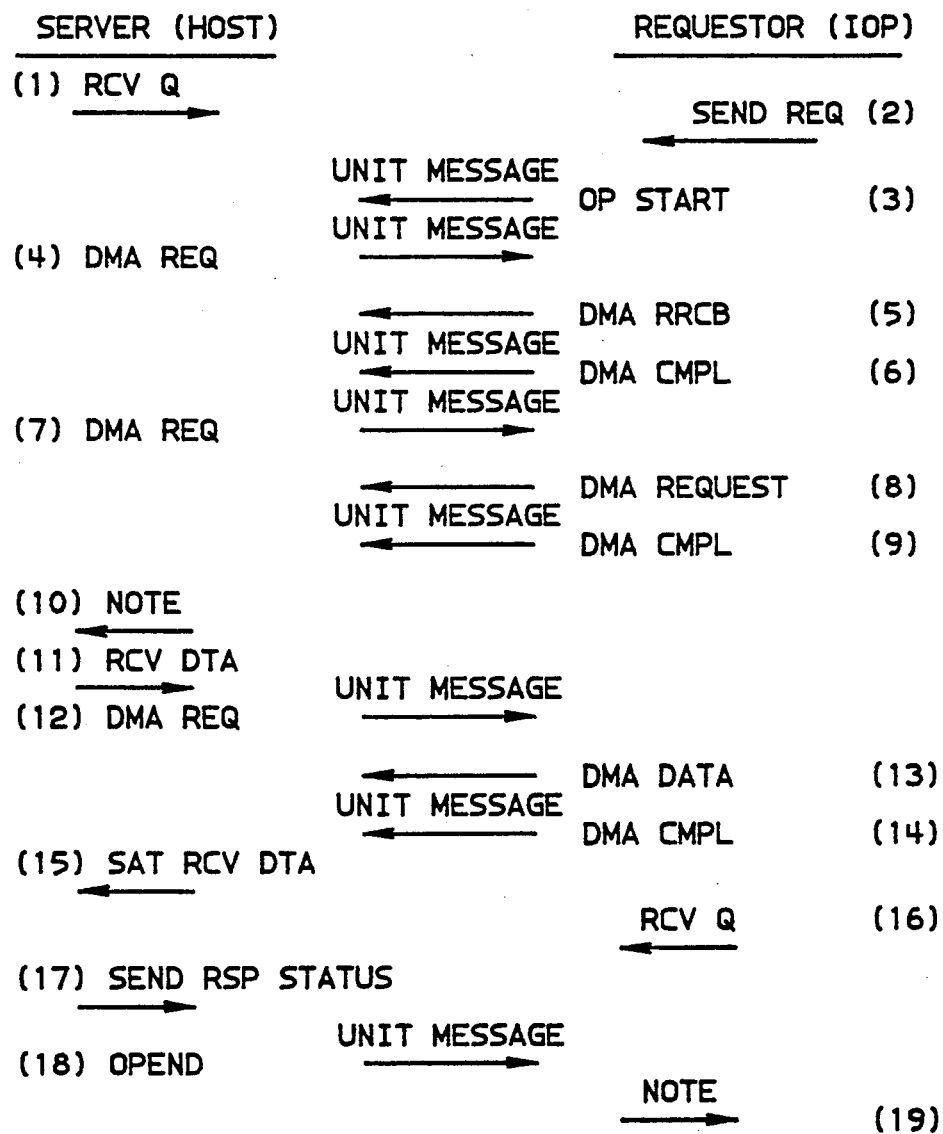
FIG. 30 is a diagram of the message flow involved in the use of DMA messages of FIG. 28 and FIG. 29 to transfer data.

FIG. 30 is a simplified message flow example of a SEND REQ operation that was initiated in a bus unit that does not have slave DMA capability.

1. The server process, in this case a process in the host bus unit, gets to a point in its processing where it wants to wait. It does a IPCI RCV Q. (This example assumes the server asked for the work request on th RCV Q.) Since there are no request notes on its input queue, the target process enters the wait state.
2. The requestor, in this example a process in the IOP, wants to send data to the server process in a host processor. The requestor process does an IPCI SEND REQ at the IPCI.
3. The Bus Manager in the IOP initiates the operation on the bus as a result of the SEND REQ issued by the requestor. The IOP's bus manager sends a bus unit message Opstart to the host.
4. The bus manager in the host sends a DMA REQ bus unit message requesting that the bus manager in the IOP do a DMA to a location specified by the bus unit message.
5. The IOP bus manager does the requested DMA operation moving the RRCB from IOP storage to the host storage.
6. The bus manager in the IOP sends a DMA Comp bus unit message to the host indicating that the requested DMA operation has been completed.
7. The bus manager in the host sends a DMA REQ bus unit message requesting that the bus manager in the IOP do a DMA operation starting at the location specified by the bus unit message. This is storage owned by the host bus manager.
8. The IOP bus manager does the requested DMA operation moving the request from IOP storage to the host storage.
9. The bus manager in the IOP sends a DMA COMP bus unit message indication that the requested DMA operation has been completed. The above 3 steps may not be required if the request is less than 4 bytes which can be immediate data in an RRCB.
10. A NOTE is sent to the appropriate server process through IPCF. This satisfies the outstanding RCV Q.
11. The server process now must issue an IPCI RCV DTA specifying where to put the data in the host storage.
12. The bus manager in the host sends a DMA REQ bus unit message requesting that the bus manager in the IOP do a DMA operation at the location specified by the bus unit message. This address is specified by the RCV DTA issued at IPCI.
13. The bus manager in the IOP does the requested DMA operation moving the user data from IOP storage to the host storage.
14. The bus manager in the IOP sends a DMA Complete bus unit message indicating that the requested DMA operation has been completed.
15. The server's RCV DTA is satisfied with the above operations.

Steps 12 through 15 are repeated as many times as necessary to transfer all the required data.

16. The requester process, in this case a process in the IOP, gets to a point in its processing where it wants to wait. It issues a RCV Q. Since there are no requests on its input queue, the requester process enters the wait state.
17. The server process now must issue a SEND RSP with the status information.
18. The bus manager in the host sends an OPEND bus unit message indicating that the requested operation has been completed.
19. A NOTE is sent to the requestor's Q. This satisfies the requestor's RCV Q.

Through use of the methods of reverse flow, the goal of keeping communications between processes independent of the processes and transparent of the processes has been kept. In fact, the bus managers are used to insulate the IPCF layers from communication details as well. The use of connection groups has permitted an enhanced level of flow control to assure that resources are allocated to processes to provide a guaranteed minimum level of service. While different preferred embodiments have been discussed, it will be clear to one skilled in the art that many variations are possible which are within the scope of the following claims.

What is claimed is:

1. A first bus unit, having master DMA capability, for coupling to a bus, which is coupled to a second bus unit which has only slave DMA capability, the first bus unit comprising:
   a processor which executes a plurality of processes, said processes requesting work from other processes on other bus units and serving work requests from other processes on other bus units, said work serving processes controlling the flow of work processing;
   a bus manager for insulating said processes from communication management, the bus manager of the first bus unit comprising:
   means for managing a storage area of the second bus unit;
   means for transferring information into the storage area of the second bus unit by using the master DMA capability of the first bus unit;
   means for generating a storage control block for identifying storage addresses of the second bus unit where the transferred information is stored; and
   means for transferring the storage control block to the second bus unit so the information is available to the second bus unit as though it had master DMA capability;
   means for processing a work request from the first bus unit to the second bus unit using the information made available to the second bus unit by said means for transferring the information, said information contained in the storage area of the second bus unit; and
   means for informing the first bus unit of any response to the work request.

2. A first bus unit, having master DMA capability for coupling to a bus, which is coupled to a second bus unit with only slave DMA capability and having a processing and storage, the first bus unit comprising:
   at least one processor which executes at least one process;
   a bus manager of the first bus unit comprising:
   means for generating a Storage Request bus message for requesting storage to manage in the second bus unit;
   means for managing a storage area of the second bus unit;
   means for transferring information into and out of the storage area of the second bus unit;

means for generating a storage control block for identifying storage addresses of the storage in the second bus unit at which the transferred information is stored; and means for transferring the storage control block to the second bus unit for use by said second bus unit in accessing the transferred information.

3. The first bus unit of claim 2 wherein the means for generating the Storage Request bus message inserts an indication of a desired amount of storage in the message.

4. The first bus unit of claim 3 wherein the means for generating the Storage Request bus message further inserts an indication of a minimum length of contiguous storage desired in the message.

5. The bus unit of claim 4 wherein its bus manager further comprises:

means for receiving a Storage List Available bus message from the second bus unit in response to the Storage Request bus message, said Storage List Available bus message indicating whether or not management of the requested storage was granted.

6. The bus unit of claim 5 wherein the Storage List Available bus message contains a field which indicates one of three conditions:
a that storage was available;
b that no storage was available; and
c that storage was available but not in the amount requested.

7. The first bus unit of claim 6 wherein the Storage List Available bus message identifies a Storage List Control Block which contains at least one address of the storage of the second bus unit for which management was granted.

8. The first bus unit of claim 7 wherein its bus manager further comprises:

means for transferring the Storage List Control Block from storage in the second bus unit to storage managed by the first bus unit's bus manager.

9. The first bus unit of claim 8 wherein its bus manager further comprises:

means for generating a Storage List Complete bus unit message which identifies storage in the second bus unit which is no longer to be managed by the first bus unit's bus manager.

10. The first bus unit of claim 2 wherein its bus manager further comprises:

means for receiving a Storage List Available bus message from the second bus unit in response to the Storage Request bus message, said Storage List Available bus message indicating whether or not management of the requested storage was granted.

11. The bus unit of claim 10 wherein the Storage List Available bus message contains a field which indicates one of three conditions:
a that the requested amount of storage was available;
b that no storage was available; and
c that storage was available but not in the amount requested.

12. The first bus unit of claim 10 wherein the Storage List Available bus message identifies a Storage List Control Block which contains at least one address of the storage of the second bus unit for which management was granted.

13. The first bus unit of claim 12 wherein the first bus unit's bus manager further comprises:

means for transferring the Storage List Control Block from storage in the second bus unit to storage managed by the first bus unit's bus manager.

14. The first bus unit of claim 2 wherein its bus manager further comprises:

means for generating a Storage List Complete bus unit message which identifies storage in the second bus unit which is no longer to be managed by the first bus unit's bus manager.

15. The first bus unit of claim 14 wherein the first bus unit's bus manager further comprises:

means for receiving a Return Storage List bus unit message which indicates that the second bus unit desires management of storage to be returned to it.

16. The first bus unit of claim 15 wherein the means for generating the Storage List Complete bus unit message includes in said message an indication of whether the second bus unit requested return of the storage.

17. A storage management mechanism in a multiprocessor computer system comprising:

a first bus unit having a main storage, and having only a slave DMA capability;

a second bus unit having a master DMA capability;

a bus coupled to said first bus unit and said second bus unit;

said second bus unit further comprising:

means for managing at least a portion of the first bus unit main storage through the bus;

means for requesting from the first bus unit a portion of the first bus unit storage to manage through the bus;

means for returning management of at least a portion of said first bus unit main storage to said first bus unit;

said first bus unit further comprising:

means for receiving requests from the second bus unit to manage a portion of the first bus unit main storage;

means for transferring management of a portion of the first bus unit main storage to the second bus unit;

means for receiving a work request from said second bus unit; and means for performing a work request from said second bus unit which includes management of a portion of first bus unit storage after said second bus returns management of said storage to said first bus unit.

18. The storage management mechanism of claim 17 wherein the second bus unit means for requesting a portion of the first bus unit main storage to manage comprises a first bus message which specifies an amount of storage, and a length of buffers desired for managing through the bus.

19. The storage management mechanism of claim 18 wherein the first bus unit means for receiving requests from the second bus unit to manage a portion of the first bus unit main storage comprises a bus manager coupled to the bus, said bus manager managing portions of the first bus unit main storage.

20. The storage management mechanism of claim 19 wherein the first bus unit means for transferring management of a portion of the first bus unit main storage to the second bus unit comprises:

a Storage List Control Block which has fields for indicating a starting address of at least one buffer in first bus unit main storage, and for indicating a length for each starting address; and a Storage List Available bus unit message for identifying the Storage List Control Block.

21. The storage management mechanism of claim 17 wherein the second bus unit means for requesting a portion of the first bus unit main storage to manage comprises a Storage Request bus unit message which specifies an amount of storage, and a length of buffers desired for managing through the I/O bus.

22. The storage management mechanism of claim 17 wherein the first bus unit means for receiving requests from the second bus unit to manage a portion of the first bus unit main storage comprises a bus manager coupled to the bus, said bus manager managing portions of the first bus unit main storage.

23. The storage management mechanism of claim 17 wherein the first bus unit means for transferring management of a portion of the first bus unit main storage to the second bus unit comprises:
   a Storage List Control Block which has fields for indicating a starting address of at least one buffer in first bus unit main storage, and for indicating a length for each starting address; and
   a Storage List Available bus unit message for identifying the Storage List Control Block.

24. The storage management mechanism of claim 23 wherein the second bus unit means for requesting a portion of the first bus unit main storage to manage comprises a Storage Request bus unit message which specifies an amount of storage, and a length of buffers desired for managing through the bus.

25. The storage management mechanism of claim 24 wherein the first bus unit means for transferring management of buffers in the first bus unit main storage to the second bus unit further comprises:
   means for verifying that each buffer identified in the Storage List Control Block is at least as long as the length specified in the Storage Request bus unit message.

26. A method of controlling data transfer associated with work in a server driven process to process communication computer system wherein a first bus unit has only slave DMA capability and a main storage, and a second bus unit has master DMA capability and a main storage, the method comprising the steps of:
   a generating a work request in a process running on the second bus unit;
   b generating a storage control block indicating storage locations in the first bus unit's main storage of the work request and its associated data;
   c transferring the work request, storage control block, and associated data to storage in the first bus unit which is managed by the second bus unit;
   d sending an indication of the work request to the first bus unit identifying the location of the storage control block;
   e transferring the work request, storage control block and associated data from the storage managed by the second bus unit to storage managed by the first bus unit; and
   f accessing the data as requested by the server process on the first bus unit which is acting on the work request.

27. The method of claim 26 and further comprising the step of:
   g notifying the second bus unit when step "e" has been completed so that the storage managed by the second bus unit may be used again by the second bus unit for transfer of further information without concern for overwriting information associated with a previous work request.

28. A storage management mechanism in a multiprocessor computer system comprising:
   a host processor having a main storage, and having only a slave DMA capability;
   an I/O controller having a main storage, and having a master DMA capability;
   an I/O bus coupled to said host processor and said I/O controller, the I/O bus facilitating communication between the host and I/O controller;
   said I/O controller further comprising:
   means for managing at least a portion of the host main storage through the I/O bus;
   means for requesting from the host a portion of the host main storage to manage through the I/O bus;
   means for transferring management of a portion of the host main storage through the I/O bus;
   means for writing information into host main storage;
   means for returning management of a portion of host main storage back to said host main processor;
   said host further comprising:
   means for receiving requests from the I/O controller to manage a portion of the host main storage;
   means for transferring management of a portion of the host main storage to the I/O controller;
   means for identifying the portion of the host main storage so transferred so that the host is aware that management responsibility has been transferred;
   means for receiving a work request from said I/O controller; and
   means for performing a work request from said I/O controller based upon information written into a portion of said host main storage by said I/O controller after management of said portion of host main storage has been returned to the host processor.

29. The storage management mechanism of claim 28 wherein the I/O controller means for requesting a portion of the host main storage to manage comprises a Storage Request bus unit message which specifies an amount of storage, and a length of buffers desired for managing through the I/O bus.

30. The storage management mechanism of claim 29 wherein the I/O controller means for transferring management of a buffer of the host main storage comprises a Storage List Complete bus unit message which contains an indication of whether or not control of a buffer is being returned.

31. The storage management mechanism of claim 30 wherein the Storage List Complete bus unit message identifies the storage for which management is returned if the message indicates that control of at least one buffer is being returned.

32. The storage management mechanism of claim 31 wherein the host means for receiving requests from the I/O controller to manage a portion of the host main storage comprises a bus manager coupled to the bus, said bus manager managing portions of the host main storage.

33. The storage management mechanism of claim 32 wherein the host means for transferring management of a portion of the host main storage to the I/O controller comprises:
   a Storage List Control Block which has fields for indicating a starting address of at least one buffer in host main storage, and for indicating a length for each starting address; and
   a Storage List Available bus unit message for identifying the Storage List Control Block.

34. The storage management mechanism of claim 28 wherein the I/O controller means for requesting a portion of the host main storage to manage comprises a Storage Request bus unit message which specifies an amount of storage, and a length of buffers desired for managing through the I/O bus.

35. The storage management mechanism of claim 28 wherein the I/O controller means for transferring management of a portion of the host main storage comprises a Storage List Complete bus unit message which contains an indication of whether or not management of a portion of storage is being returned.

36. The storage management mechanism of claim 35 wherein the Storage List Complete bus unit message identifies the storage for which management is returned if the message indicates that a portion is being returned.

37. The storage management mechanism of claim 28 wherein the host means for receiving requests from the I/O controller to manage a portion of the host main storage comprises a bus manager coupled to the bus, said bus manager managing portions of the host main storage.

38. The storage management mechanism of claim 28 wherein the host means for transferring management of a portion of the host main storage to the I/O controller comprises:
 a Storage List Control Block which has fields for indicating a starting address of at least one buffer in host main storage, and for indicating a length for each starting address; and
 a Storage List Available bus unit message for identifying the Storage List Control Block.

39. The storage management mechanism of claim 38 wherein the I/O controller means for requesting a portion of the host main storage to manage comprises a Storage Request bus unit message which specifies an amount of storage, and a length of buffers desired for managing through the I/O bus.

40. The storage management mechanism of claim 39 wherein the host means for transferring management of buffers in the host main storage to the I/O controller further comprises:
 means for verifying that each buffer identified in the Storage List Control Block is at least as long as the length specified in the Storage Request bus unit message.

41. A first bus unit, having master DMA capability, for coupling to a bus, which is coupled to a second bus unit with only slave DMA capability and having a processor and storage, the first bus unit comprising:
 at least one processor which executes at least one process;
 a bus manager of the first bus unit comprising:
  means for managing a storage area of the second bus unit;
  means for transferring information into and out of the storage area of the second bus unit;
  means for generating a storage control block for identifying storage addresses of the storage in the second bus unit at which the transferred information is stored;
  means for transferring the storage control block to the second bus unit for use by said second bus unit in accessing the transferred information; and
 the second bus comprising:
  means for receiving a request from said first bus unit;
  means for performing a request from said first bus unit using information transferred to the second bus unit by the first bus unit, said information accessed by use of the storage control block transferred from said first bus unit; and
  means for indicating a response to the work request of said first bus unit.

42. A bus management mechanism in a computer system comprising:
 a first bus unit attached to the bus, said first bus unit having master DMA capability and a first bus manager for insulating processes from communication management;
 a second bus unit attached to the bus, said second bus unit having slave DMA capability and a second bus manager for insulating processes from communication management;
 said first bus unit further comprising:
 means for the first bus manager to obtain a portion of memory in said second bus unit;
 means for the first bus manager to transfer a request into a portion of memory in the second bus unit;
 means for the first bus manager to transfer data necessary to perform a request into a portion of memory in the second bus unit;
 means for sending a message to start operating the request;
 said second bus unit further comprising:
 means for obtaining access to the request from the first bus unit and the data for performing the request which is located on the portion of memory in the second bus unit;
 means for performing the request; means for generating a message to the first bus unit indicating that the request has been completed resulting in a response; and
 means for placing the response in a portion of the memory of the second bus unit so that the first bus unit manager can obtain the response to the request.

* * * * *

UNITED STATES PATENT AND TRADEMARK OFFICE
CERTIFICATE OF CORRECTION

PATENT NO. : 5,204,954

DATED : April 20, 1993

INVENTOR(S) : William E. Hammer, Walter H. Schwane, Frederick J. Ziecina

It is certified that error appears in the above-identified patent and that said Letters Patent is hereby corrected as shown below:

Claim 2, Column 24, Line 57  delete "process-" and insert -- processor --

Claim 2, Column 24, Line 58  delete "ing"

Signed and Sealed this

Twenty-eighth Day of December, 1993

Attest:

BRUCE LEHMAN

Attesting Officer    Commissioner of Patents and Trademarks